US012632854B2

(12) United States Patent
Coughlan et al.

(10) Patent No.: US 12,632,854 B2
(45) Date of Patent: May 19, 2026

(54) COMPUTER-IMPLEMENTED SYSTEM AND METHOD

(71) Applicant: nChain Licensing AG, Zug (CH)

(72) Inventors: Steven Coughlan, London (GB); Ambrose Sraha, London (GB); Dulan Weerasin-Ha, London (GB)

(73) Assignee: nChain Licensing AG, Zug (CH)

( * ) Notice: Subject to any disclaimer, the term of this patent is extended or adjusted under 35 U.S.C. 154(b) by 198 days.

(21) Appl. No.: 17/764,134

(22) PCT Filed: Sep. 18, 2020

(86) PCT No.: PCT/IB2020/058709
§ 371 (c)(1),
(2) Date: Mar. 25, 2022

(87) PCT Pub. No.: WO2021/064504
PCT Pub. Date: Apr. 8, 2021

(65) Prior Publication Data
US 2022/0405747 A1 Dec. 22, 2022

(30) Foreign Application Priority Data

Sep. 30, 2019 (GB) ...................................... 1914043
Jul. 6, 2020 (GB) ...................................... 2010339

(51) Int. Cl.
*G06Q 20/38* (2012.01)
*G06Q 20/06* (2012.01)
*G06Q 30/0283* (2023.01)

(52) U.S. Cl.
CPC ....... *G06Q 20/3825* (2013.01); *G06Q 20/065* (2013.01); *G06Q 20/389* (2013.01); *G06Q 30/0283* (2013.01)

(58) Field of Classification Search
CPC ............. G06Q 20/3825; G06Q 20/065; G06Q 20/389; G06Q 30/0283
See application file for complete search history.

(56) References Cited

U.S. PATENT DOCUMENTS 11,176,506 B2 * 11/2021 Konik .................. G06Q 20/382
2018/0005318 A1 * 1/2018 Pierce .................. G06Q 20/065
(Continued)

FOREIGN PATENT DOCUMENTS

CN 109886791 A 6/2019
JP 2022532464 A 7/2022
WO 2020001735 A1 1/2020

OTHER PUBLICATIONS

Wikipedia.org, "Digital Signature Algorithm", revision date Sep. 18, 2019, https://en.wikipedia.org/w/index.php?title=Digital_Signature_Algorithm&oldid=916341727. (Year: 2019).*
(Continued)

*Primary Examiner* — Patrick Mcatee
*Assistant Examiner* — Scott Michael Diroma
(74) *Attorney, Agent, or Firm* — Galvani Smith PLLC

(57) ABSTRACT

In a first aspect, the present disclosure proposes methods, devices and systems for implementing a payment service for enabling transactions associated with a client to be written into, or stored in a distributed ledger, i.e. a blockchain. The payment service is implemented as an API to which one or more clients have access to processing digital asset payments pertaining to a respective client. In a first aspect includes obtaining mining fee quotes from a plurality of miners for a client and processing a request for submitting a transaction to the blockchain based on a selected fee quote. In a second aspect, the present disclosure proposes methods, devices and systems for requesting a transaction associated with a digital asset payment to be mined in a blockchain, based on a digital asset payment between a client (payer) and
(Continued)

| | |
|---|---|
| 102 | Receive request for mining fee quote from a client |
| 104 | Obtain mining fee quote from a plurality of miners |
| 106 | Send fee quotes to client |
| 108 | Receive a request to submit a transaction based on a selected fee quote |
| 110 | Send a request to one or more miners to create a blockchain transaction |
| 112 | Receive a UTXO from a miner satisfying the selected fee quote |
| 114 | Send a result to the client with a TxID |
| 116 | Received a status query associated with a TxID |
| 118 | Obtain a corresponding blockchain transaction from a given miner |
| 120 | Send the mining result to the client | a customer (payee) of the client. The request being associated by a selected fee quote and/or service level associated with the selected fee quote among the received fee quotes in the above aspect. In a third aspect the method includes creating, processing and mining a blockchain transaction associated with a client by a miner, based on the miner satisfying the selected fee quote from the client, as mentioned in the above aspect.

8 Claims, 8 Drawing Sheets

(56)                References Cited

U.S. PATENT DOCUMENTS

| | | | | |
|---|---|---|---|---|
| 2018/0337769 | A1 | 11/2018 | Gleichauf | |
| 2019/0080304 | A1 | 3/2019 | Klarman et al. | |
| 2019/0104196 | A1* | 4/2019 | Li | H04L 9/0637 |
| 2019/0205973 | A1* | 7/2019 | Gutnik | G06Q 30/0267 |
| 2019/0334957 | A1* | 10/2019 | Davis | H04L 65/403 |
| 2020/0098072 | A1* | 3/2020 | Escobar | G06Q 10/06 |
| 2020/0302563 | A1* | 9/2020 | Golway | G06Q 50/188 |
| 2020/0387943 | A1* | 12/2020 | Montcalm | G06Q 10/1053 |

OTHER PUBLICATIONS

Franco, Pedro, Understanding Bitcoin: Cryptography, Engineering and Economics, published 2015 by Wiley. (Year: 2015).*

PCT/IB2020/058709 International Search Report and Written Opinion dated Dec. 18, 2020.
Kai Li et al: Secure Consistency Verification for Untrusted Cloud Storage by Public Blockchains11, Apr. 14, 2019, arxiv.org, Cornell University Library, 201 Online Library Cornell University Ithaca, NY.
Mattias Scherer, Performance and Scalability of Blockchain Networks and Smart Contracts, Jun. 19, 2017 (Jun. 19, 2017), XP055525046, Retrieved from the Internet: URL: https://umu.diva-portal.org/smash/get/ diva2:1111497/FULLTEXT01.pdf [retrieved on Jun. 19, 2017].
ETH Gas Station [online], Feb. 1, 2019, [Date of search: Jun. 19, 2024], 2 pages, Retrieved from the Internet URL: https://web.archive.org/web/20190201044129/https://ethgasstation.info/.
Gas Price Recommendations FAQ [online], Jan. 26, 2019, [Date of search: Jun. 19, 2024], 1 page, Retrieved from the Internet URL: https://web.archive.org/web/20190126190348/https://ethgasstation.info/gasrecs.php.
Kinoshita M., "Self-Made Blockchains and Cryptocurrencies," Nikkei Software, Japan, Nikkei Business Publications, Inc., Sep. 24, 2017, vol. 20, No. 11, pp. 30-39, ISSN: 1347-4685.
Other FAQ, FAQ [online], Feb. 8, 2019, [Date of search: Jun. 19, 2024], 1 page, Retrieved from the Internet URL: https://web.archive.org/web/20190208191558/https://ethgasstation.info/FAQpage.php.
Toriyabe A., et al., "Full-Fledged Introduction to Smart Contracts," 1st edition, Gijutsu-Hyoron Co., Ltd., Representative Director: Iwao Kataoka, Mar. 1, 2017, pp. 131-133, ISBN:978-4-7741-8746-4.
Second Office Action of CN Application No. 202080069033.5 and english translation, dated Jul. 25, 2025, 11 pages.

* cited by examiner

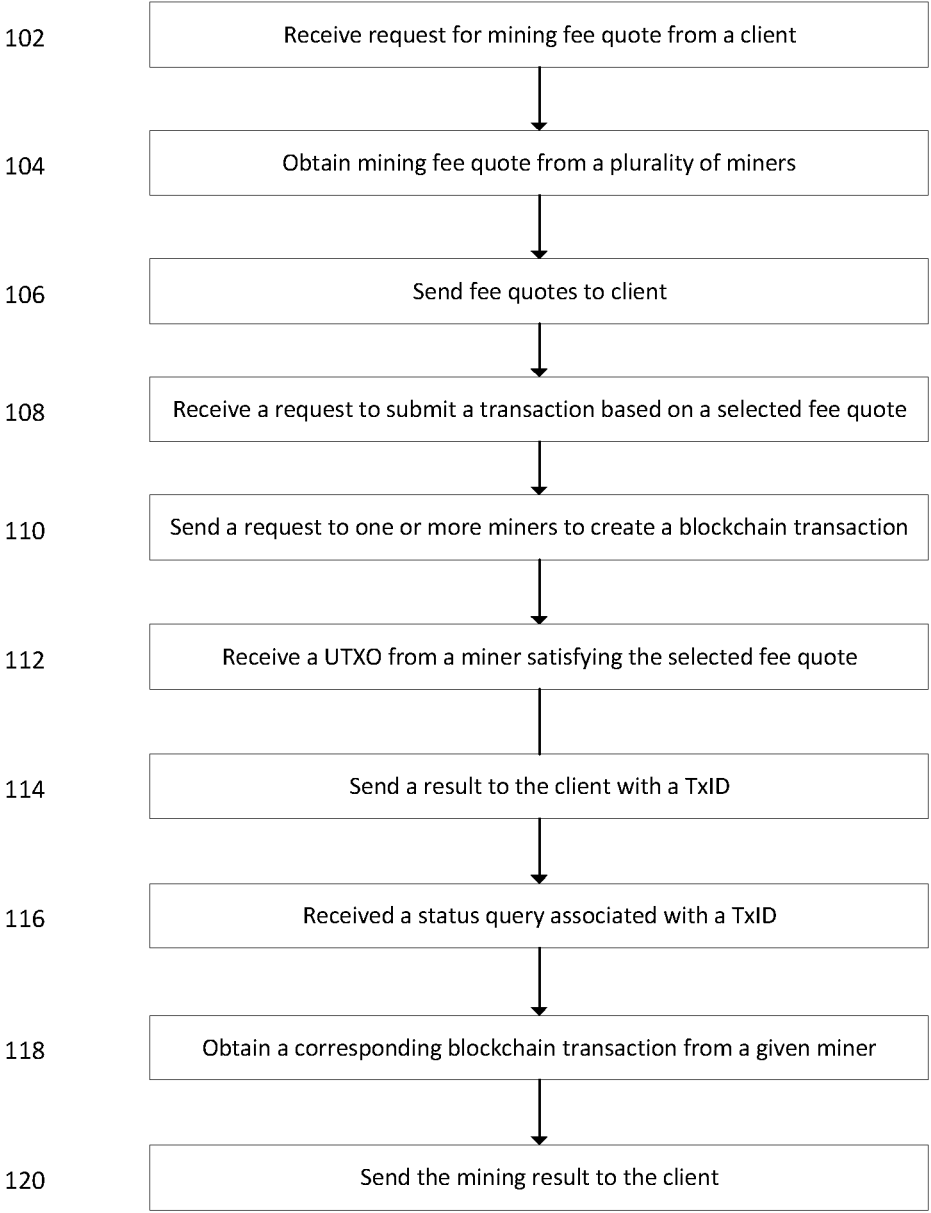

102    Receive request for mining fee quote from a client

104    Obtain mining fee quote from a plurality of miners

106    Send fee quotes to client

108    Receive a request to submit a transaction based on a selected fee quote

110    Send a request to one or more miners to create a blockchain transaction

112    Receive a UTXO from a miner satisfying the selected fee quote

114    Send a result to the client with a TxID

116    Received a status query associated with a TxID

118    Obtain a corresponding blockchain transaction from a given miner

120    Send the mining result to the client

Figure 1

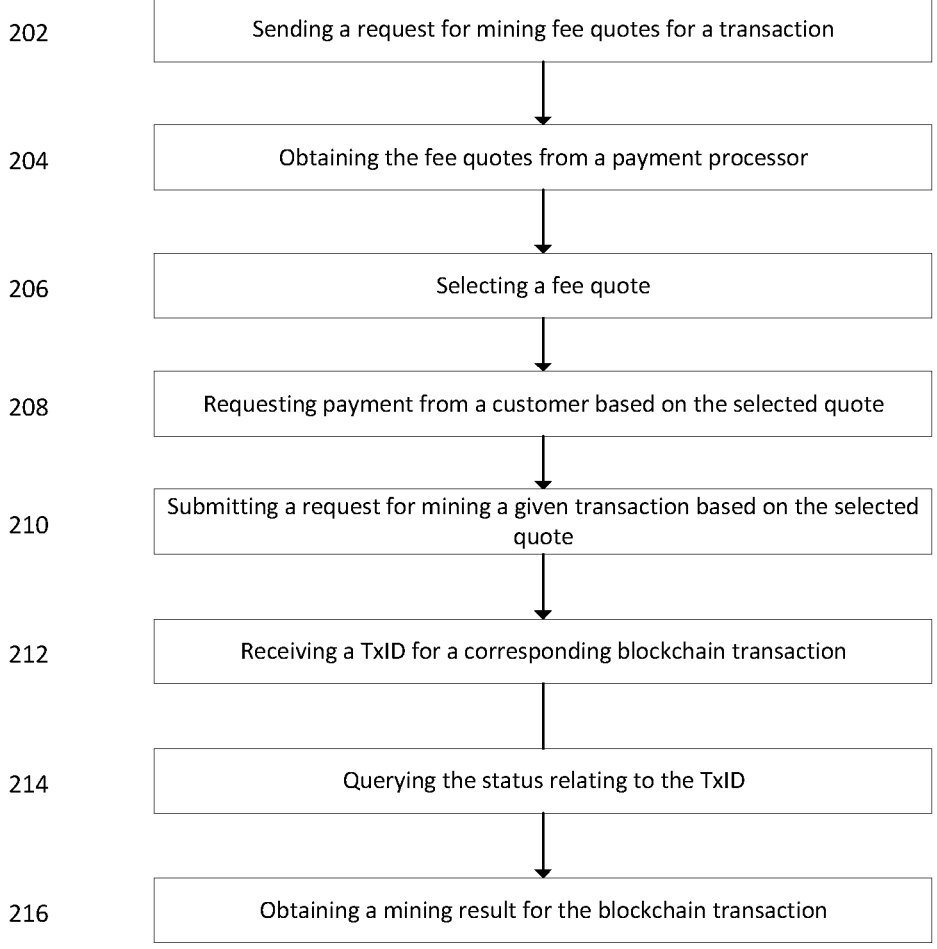

202     Sending a request for mining fee quotes for a transaction

204     Obtaining the fee quotes from a payment processor

206     Selecting a fee quote

208     Requesting payment from a customer based on the selected quote

210     Submitting a request for mining a given transaction based on the selected quote 212     Receiving a TxID for a corresponding blockchain transaction 214     Querying the status relating to the TxID 216     Obtaining a mining result for the blockchain transaction

Figure 2

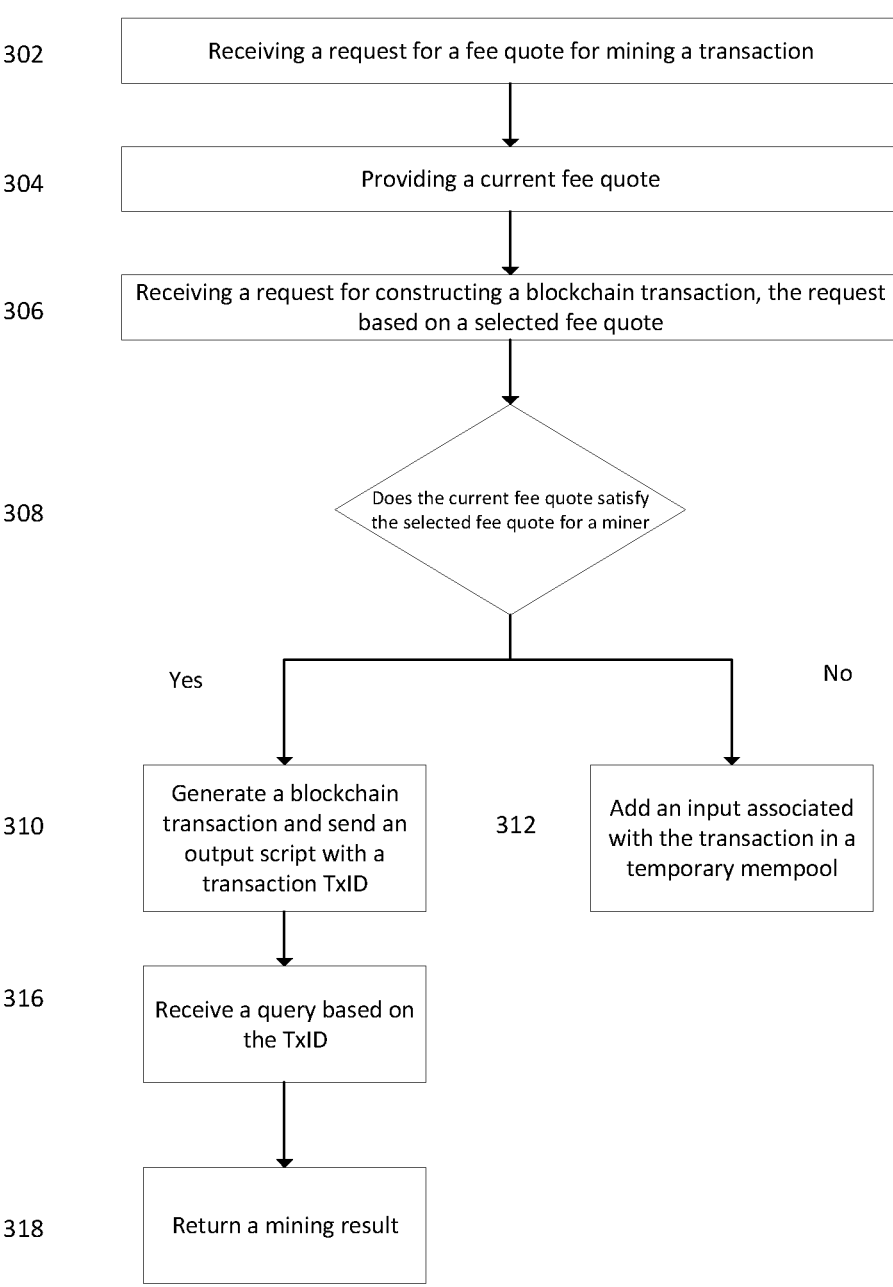

302    Receiving a request for a fee quote for mining a transaction

304    Providing a current fee quote

306    Receiving a request for constructing a blockchain transaction, the request based on a selected fee quote 308    Does the current fee quote satisfy the selected fee quote for a miner Yes                                                        No 310    Generate a blockchain transaction and send an output script with a transaction TxID 312    Add an input associated with the transaction in a temporary mempool 316    Receive a query based on the TxID 318    Return a mining result

Figure 3

COMPUTER-IMPLEMENTED SYSTEM AND METHOD

CROSS REFERENCE TO RELATED APPLICATIONS

This application is the U.S. National Stage of International Application No. PCT/162020/058709 filed on Sep. 18, 2020, which claims the benefit of United Kingdom Patent Application No. 1914043.3, filed on Sep. 30, 2019, and United Kingdom Patent Application No. 2010339.6 filed on Jul. 6, 2020, the contents of which are incorporated herein by reference in their entireties.

TECHNICAL FIELD

This disclosure relates generally to methods and systems for implementing a payment service or a payment interface for one or more clients. Particularly, but not limited to, the present disclosure relates to enabling secure and reliable payment transactions associated with a blockchain or distributed ledger for, or on behalf of, one or more clients, the transactions pertaining to a digital asset payment associated with a customer or a payer entity.

BACKGROUND

In this document we use the term 'blockchain' to include all forms of electronic, computer-based, distributed ledgers. These include consensus-based blockchain and transaction-chain technologies, permissioned and un-permissioned ledgers, shared ledgers, public and private blockchains, and variations thereof. The most widely known application of blockchain technology is the Bitcoin ledger, although other blockchain implementations have been proposed and developed. While Bitcoin may be referred to herein for the purpose of convenience and illustration, it should be noted that the disclosure is not limited to use with the Bitcoin blockchain, and alternative blockchain implementations and protocols associated with any kind of digital asset or a representation of a digital asset fall within the scope of the present disclosure. The terms "client", "entity", "node", "user", "sender", "recipient", "payer", "payee" may refer herein to a computing or processor-based resource. The term "Bitcoin" is used herein to include any version or variation that derives from or is based on the Bitcoin protocol. The term "digital asset" may refer to any transferrable asset such as cryptocurrency, tokens representing at least a part of a property, a smart contract, a license, i.e. software license, or DRM contracts for media content etc. It will be understood that the term digital asset is used throughout this document to represent a commodity that may be associated with value that may be transferred to or provided as a payment in a transaction from one entity to another.

A blockchain is a peer-to-peer, electronic ledger which is implemented as a computer-based decentralised, distributed system made up of blocks which in turn are made up of transactions. Each transaction is a data structure that encodes the transfer of control of a digital asset between participants in the blockchain system and includes at least one input and at least one output. Each block contains a hash of the previous block so that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid, and the transaction is then written to the blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e. added to the public ledger of past transactions.

Once stored in the blockchain as a UTXO, a user can transfer control of the associated resource to another address associated with an input in another transaction. This transfer is usually, but not essentially, done using a digital wallet. This digital wallet may be a device, physical medium, program, application (app) on a computing device such as a desktop, laptop or a mobile terminal, or a remotely hosted service associated with a domain on a network work, such as the Internet. The digital wallet stores public and private keys and can be used to track ownership of resources, tokens and assets etc. associated with a user, receive or spend digital assets, transfer tokens which may relate to digital assets such as cryptocurrencies, or licenses, or property, or other types of resource.

Although blockchain technology is most widely known for the use of cryptocurrency implementation, digital entrepreneurs are exploring the use of both the cryptographic security system Bitcoin is based on, and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper-proof records of events, distributed processing etc.) while being more versatile in their applications. One area of current research is the use of the blockchain for the implementation of "smart contracts". These are computer programs designed to automate the execution of the terms of a machine-readable contract or agreement. Unlike a traditional contract which would be written in natural language, a smart contract is a machine executable program which comprises rules that can process inputs in order to produce results, which can then cause actions to be performed dependent upon those results. Another area of blockchain-related interest is the use of 'tokens' (or 'coloured coins') to represent and transfer real-world entities via the blockchain. A potentially sensitive or secret item can be represented by the token which has no discernible meaning or value. The token thus serves as an identifier that allows the real-world item to be referenced from the blockchain.

The above-mentioned examples or scenarios relate to a transfer of some asset, i.e. a digital asset, or control of a digital asset between users or entities. Accordingly, there is a desire to implement a secure and robust system that is akin to existing payment or e-commerce systems for exchange of funds between two entities—especially for digital asset payments between a merchant and a customer that may respect an asset in real world, with a better user experience, a cheaper merchant or payee costs, and a safer level of security. More particularly there is a desire to make use of distributed ledger (blockchain) technology and the advantages of increased security, transparency and reliability of records to provide a common platform or interface that enables any merchant, or a plurality of merchants, to ensure that digital asset payments with their respective customers can be instantaneously and securely mined or written into the blockchain, thereby providing a lasting, tamper-proof and auditable record of such payments.

Such an improved solution has now been devised. The present disclosure addresses these technical concerns by proposing techniques by which transactions for one or more clients, i.e. merchants or payee entities, that are recipients of digital assets such as a cryptocurrency, may be instantaneously written into the blockchain by methods, techniques and devices that provide an application programming interface (API) for such clients. In such techniques miners will be able to dynamically, or instantly mine or write transactions into the blockchain, i.e. provide a service allowing instant transactions or zero-confirmation transactions (0-conf), for the client in a secure and reliable manner.

SUMMARY

In a first aspect, the present disclosure proposes methods, devices and systems for implementing a payment service for enabling transactions associated with a client to be written into, or stored in a distributed ledger, i.e. a blockchain. The payment service is implemented as an API to which one or more clients have access to processing digital asset payments pertaining to a respective client. In a first aspect includes obtaining mining fee quotes from a plurality of miners for a client and processing a request for submitting a transaction to the blockchain based on a selected fee quote.

In a second aspect, the present disclosure proposes methods, devices and systems for requesting a transaction associated with a digital asset payment to be mined in a blockchain, based on a digital asset payment between a client (payer) and a customer (payee) of the client. The request being associated by a selected fee quote among the received fee quotes in the above aspect.

In a third aspect the method includes creating, processing and mining a blockchain transaction associated with a client by a miner, based on the miner satisfying the selected fee quote from the client, as mentioned in the above aspect.

Throughout this specification the word "comprise", or variations such as "includes", "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF THE DRAWINGS

Aspects and embodiments of the present disclosure will now be described, by way of example only, and with reference to the accompany drawings, in which:

FIG. 1 is a flowchart depicting a method for implementing a payment service or payment interface for enabling digital asset transactions associated with a blockchain for one or more clients, the method implemented by a payment processor according to a first aspect FIG. 2 is a flowchart depicting a method for requesting processing of blockchain transaction, the blockchain transaction associated with a digital asset payment associated with a client, where the method is implemented by one or more processors associated with a client according to a second aspect.

FIG. 3 is a flowchart depicting a method of processing a blockchain transaction associated with a digital asset payment for a client, where the method is implemented by one or more processors associated with a miner according to a third aspect.

DETAILED DESCRIPTION

Figure 4:
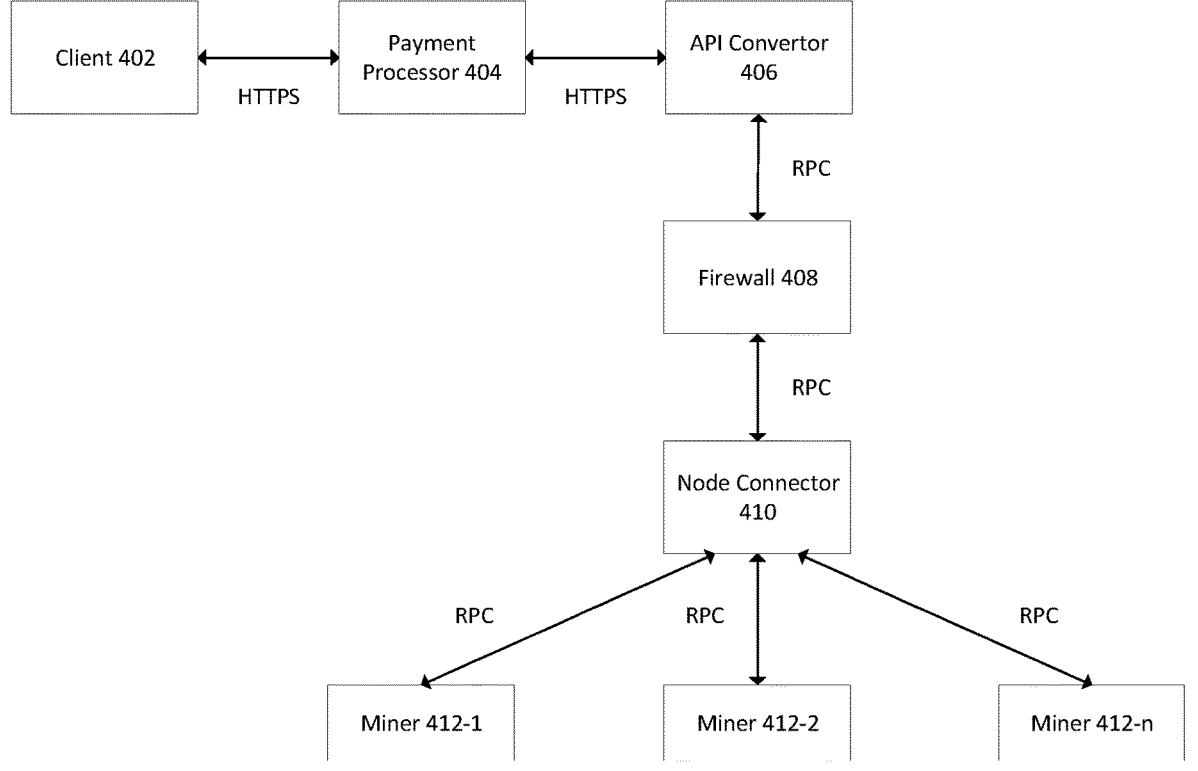
FIG. 4 is a schematic diagram illustrating a system for proving a payment service or payment interface for enabling blockchain transaction for a client.

In accordance with a first aspect, the present disclosure provides a computer implemented method of implementing a payment service for one or more clients for transactions associated with a blockchain, the method implemented by a payment processor associated with the payment service. In some embodiments, where a client may be a computing resource or a node, or entity that may be associated with a digital wallet for accepting and/or processing cryptocurrency payments and may be associated with a public key or public address for such wallet. In some embodiments the client may represent a merchant entity or terminal, such as e.g. a point of sale device, that provides goods or services in the real world and receives digital asset payments for such goods or services but is not so limited. In some embodiments the payment processor is configured to provide a payment interface for the one or more clients as an associated or a third-party service. In some examples the payment processor is referred to as a payment aggregator, as it provides a plurality of payment services and functions associated with the blockchain via one or more user friendly interfaces for clients, as well as miners. In some embodiments, the payment processor is implemented as an application programming interface (API) for providing a web-based interaction, i.e. implemented as a web services, for the one or more clients such that communication may take place over the Internet using standard Internet communication protocols for web based services, such as HTTPS, TCP/IP etc. This API is either known or made available to or is sent/provided to the one or more clients associated with the payment processor. In some embodiments, this API may be provided to the client upon a registration or sign up process to access the service or functions provided by the payment processor. In some examples, the API may be provided or published for use by the client via API user interfaces such as Swagger, which is a well-known API design and development tool or interface for clients or other entities wishing to access a web-based service.

The method of the first aspect comprising the steps of obtaining a fee quote from each miner among a plurality of miners for mining the transaction. This step takes place responsive to a first request from a client for mining fee quotes associated with mining a transaction. In some embodiments, the first request from the client may be for a fee quote for mining a single transaction or for a fee quote or quotes for mining multiple transactions. In some embodiments, if there are multiple transactions, the payment processor may be associated with a separate API or endpoint for receiving or handling or processing requests associated with two or more (multiple) transactions together. Such endpoint may also process single or individual transactions. In other embodiments, the same endpoint, i.e. the previously mentioned API associated with payment processor, is used for single as well as multiple transactions. Accordingly, the fee quotes obtained from one or miners may be: (i) a fee quote obtained from each miner for a single transaction, (ii) a plurality of separate fee quotes from each miner, one for each of the multiple transactions, (iii) a single fee quote to be applied to each of the multiple transactions, (iv) or a single consolidated fee quote that covers the mining fees for mining all of the multiple transactions requested by the client in the first request. In some embodiments the miners are nodes, implemented by one or more processors that are entrusted with validation of the locking and unlocking scripts, and mining or writing transactions to the blockchain, as also explained above in the background section. For example, if Bitcoin Satoshi's Vision (BSV) is the cryptocurrency or digital asset to be traded or transferred, the miners may be referred to as BSV nodes. The method of the first aspect includes the step of providing the obtained fee quotes to the client. In some embodiments the fee quotes relate to a current fee that is levied or charged by a miner for mining a transaction into the blockchain, irrespective of what the transaction related to, or the parties involved. In other embodiments, the fee quote may be tailored to be based on a given transaction that may be identified in the request. In some embodiments the payment processor may provide all received fees quotes to the client or may provide one or more recommended fee quotes to provide to the client among the obtained fee quotes.

Advantageously, by implementing a payment service that is provided as an API for one or more clients, i.e. merchants or payee entities, that are recipients of digital assets such as a cryptocurrency like Bitcoin SV (BSV), the method of the first aspect allows payment transactions to be almost instantaneously mined (written into the blockchain), or mined as soon as possible following the miner solving a proof of work puzzle, by allowing the client to sign up, or use a web service provided by the payment processor. By providing a current fee quote a given miner in theory agrees or commits to add the transaction to the next block to be mined by the given miner for that fee. Advantageously, this means that the client, i.e. a merchant entity, no longer has to wait for any confirmations from miners. Therefore, advantageously the 0-conf transactions associated with the client and respective miner can be implemented. The identity of the client using the payment service API can advantageously remain anonymous, while all transactions associated with the client can still be reliably mined by a miner among the plurality of miners that meets or satisfies a chosen, or selected fee quote for mining. Thus, an individual client or merchant can avail the benefits of transparency, reliability and provision of a non-modifiable and verifiable record of all payments associated with the respective client, without having to implement any additional processing or networking resources, and by making use of the proposed payment service API.

In some embodiments of the first aspect, responsive to a second request from the client to submit a given transaction pertaining to or including a selected fee quote among the obtained fee quotes, the method includes sending a request to one or more miners among the plurality of miners for generating a blockchain transaction for the given transaction. In some embodiments, as mentioned above the request from the client may be to submit multiple transactions, rather than a single transaction. This is advantageous where a client may be a merchant entity that processes or handles a large number of transactions in any given period, where a period may be dynamically defined or predefined to be a number of minute, hours or days. This advantageously allows seamless scalability associated with a blockchain network in accordance with the client workload/performance requirements, and may be based on the amount of transactions and/or customers handled by the client. If there are multiple transactions, the payment processor may be associated with a separate endpoint for submitting multiple transactions in some embodiments. In other embodiments, the same API endpoint for the payment processor is used for requests from the client for submitting single as well as multiple transactions.

In some embodiments, the selected fee quote is received from the client and is selected for the given transaction, which in turn may be related to a payment request or a payment transaction between the client and another node or entity, such as the customer for the client in view of goods or services purchased from the client for which a digital asset payment is required. The method then includes receiving an output script, for instance an UTXO, associated with the blockchain transaction from at least one miner among the plurality of miners that satisfies the selected fee quote. For instance, in some embodiments to satisfy the fee quote, the at least one miner should have provided or be associated with a current fee quote that has a value that is above, or below the selected fee quote, and in some cases above the selected fee quote depending on one or more rules, or predetermined criteria associated with the client. The method then includes sending a result to the client, the result including a transaction identifier (TxID) for the blockchain transaction, pertaining to the given transaction, i.e. payment between the client and customer.

Advantageously, the API of the present disclosure may be implemented as a REST (Representational State Transfer) endpoint, thereby allowing the client to communication using standard Internet or web-based protocols, such as HTTPS. Furthermore, advantageously the payment service of the first aspect enables a corresponding transaction associated with a digital asset payment can be created and written into the blockchain instantaneously based on the selected fee quote. Mining the transaction based on the selected fee quote that is selected or chosen by the client, or the payment processor on behalf of the client, advantageously enables at least one miner among a plurality of miners to mine or write a transaction into the blockchain almost instantaneously or a soon as possible, having already provided the assurance that a given miner will mine the transaction at a current fee quote that matches or satisfies the selected fee quote from the client. Thus, the payment service API has an advantage allowing instant transactions or zero-confirmation transactions (0-conf), to be mined in a blockchain for the client in a secure and reliable manner, without the client having to wait for confirmation from a miner that a transaction has indeed been added to a block and will be mined in the blockchain. This is because a given miner has already indicated that the given miner can perform mining by sending the current fee quote for mining the transaction, in response to the first request. The method of the first aspect reduces double spend risks associated with allowing instant transactions to be mined, as mining according to the first aspect will take place based on a selected fee quote chosen by, or for the client. Thus, only a miner that satisfies the selected fee quote may mine the transaction, and once the transaction is added into a block associated with the blockchain by a first miner that satisfies the fee quote, the transaction cannot be mined by other miners.

Some embodiments of the method according to the first aspect of providing a payment service implemented by a payment processor comprises providing the obtained transaction mining fee quotes based on determining a recommended fee to propose to the client, where the determined fee may be an average value of the obtained fee quotes, or the maximum value of the obtained fee quotes from the plurality of miners. Advantageously, in an attempt to avoid double-spends, the payment processor can recommend that the transaction is submitted with the highest fee value obtained from the plurality of miners in response to the first request. This way, all miners can be provided with an equal chance of mining that transaction at their respective current quoted fee. However, if the recommendation is to submit the transaction with a fee at, or above the median or average of all fee quotes received, miners with higher quotes can simply keep that transaction in a mempool, such as a secondary memory pool, and use it to check against, and reject any double spends of the transactions. Similar advantages apply if the selected fee quote is based on the recommended fee quote, or if the recommendation is part of the selection done by the client.

Advantageously, the payment processor recommends a fee quote that the client can then choose to be the selected fee quote, which in some embodiments is the maximum that the client is willing to pay for submitting a transaction associated with a digital asset payment to the client. This is advantageous if the client is a computationally unsophisticated one, or if the client has predetermined that a recommendation is provided by the payment processor, rather than selecting the fee quote themselves. Thus, advantageously the client can select a fee quote based on the recommended fee quote, rather than applying a new or separate heuristic or computation for selecting a fee quote, or arbitrarily selecting a fee quote.

In some embodiments, when a recommendation or a recommended fee quote is provided from the payment service, i.e. the API provided by the payment processor, this recommended fee quote may be provided, or all the obtained fee quotes, including the recommended fee quote, the recommended fee quote including an identifier, may be provided. Advantageously, by providing a recommendation as well as all fee quotes that are received, the payment processor provided the client with the option of either using the recommended fee quote for submitting a transaction or selecting a different fee quotes from the other fee quotes received.

In some embodiments, once the fee quotes are obtained from the miners, the method of the first aspect includes classifying the obtained fee quotes into service levels or service categories by the payment processor. In some embodiments this may be based on the fee quote obtained for a single or a batch of transactions from each miner. For example, if the obtained fee quote is within a dynamically set, or a predefined range, then a specific service level is assigned for a given miner. In some embodiments this service level may be based on a transaction fee (for example, this may be the fee that is that quoted by the miner) and a relay fee. The relay fee is the minimum fee possible for a given miner to consider validating a transaction and subsequently relaying it to peer nodes in the blockchain network. In some cases, both these fees may be the same. In most cases, the relay fee will be lower than the quoted transaction fee from the given miner. For some blockchains, the fee quoted by the miner is usually a set or a default transaction fee that stays the same for any transaction. In some embodiments the relay fee is known or/and may be a common, i.e. a default relay fee, for the plurality of miners. As mentioned above, in most cases this relay fee is lower than the transaction fee. Sometimes, it may be the same as the transaction fee.

A specific service level among a plurality of possible service levels assigned for a fee quote obtained from the miner may in some embodiment be based on a priority associated with the transaction(s) that is(are) to be mined in a block. In some embodiments, the specific service level may also be based on an extent of double spend protection offered by the miner to ensure that any malign attempts to further spend funds/digital assets associated with the same transaction is rejected. Thus, a higher service level may indicate a higher priority transactions that may be needed to be mined within a short time period, such as less than a few minutes, i.e. within 15-20 minutes, and with better double spend protection. A lower service level may be associated with longer mining times, such as within 24-48 hours and/or without double spend protection offered for transactions not mined by the given miner. In some embodiments, the priority of the transaction may be provided by the client and the service level is then associated with this client for all transactions, based on the client requirements. In some embodiments, the double spend protection may be associated with the functionality of storing transactions that are not mined by a given miner in a secondary memory pool so that checks against double spends may be carried out.

In some embodiments, the determination of the service level may be based on static values and rules associated with a configuration record or file entry associated with the payment processor. In such cases, these values for assigning service levels may be set for at the payment processor. In other embodiments, it may be possible to add new values or rules or amend the configuration record to further define the features associated with a given service level. This may be in addition to, or in some cases instead of one of more of the above-described priority for transactions and double spend protection associated with a given service level. This may then be compared with the fee quotes obtained for assigning the service levels.

In some embodiments, a transaction fee associated with a given service level may be either dynamically assigned or predefined as a default recommended or selected fee by the payment processor for that service level. This recommended or selected fee may in some embodiments then be sent to the client, along with a service level indicator offered by a given miner. In some embodiments, the fee associated with each service level may already be known to or agreed with the client. For instance, the service level based on client requirements as well as a selected fee associated with the client for transaction may in some cases be pre-agreed. This may be based on an external service level agreement or may be set when the client registers for use of the service or functionality offered by the payment processor. In some embodiments, the service level as well as the fee may be selected by the client for each transaction, or in the case of a batch of multiple transactions—for that batch of transactions.

In some embodiments, a service level that is pre-assigned or recommended or selected by the payment processor may be based on one or more service requirements received from the client as part of the first request. In some embodiments, the service level is provided or identified to the miner along with the selected/recommended quote, with the request for creating a blockchain transaction.

Advantageously, the mining fee categorisation based on a defined set of service levels that can then be associated with the respective miner ensures transparency as well as standardisation of the amount of mining fees to be applied for mining transactions, as well as transparency of the performance associated with a given miner for mining the transactions at an assigned service level. As the number of transactions that are to be posted or submitted on a blockchain increases as the use of the blockchain for may applications scales, such categorisation of a defined number of service levels ensures transparency and greater visibility of fees charges for the service expected, along with certainty that a required level of protection against double spends is provided by the miner. This is important to ensure seamless scalability for an exponential increase in the number of clients, miners as well as transactions per client/miner handled by the payment processor associated with a blockchain. Currently, with all existing miner fee mechanisms there is no assurance or visibility that a quoted fee rate will actually provide 0-conf safety.

Once categorised by the payment processor based on a default or defined or known relay fee, such categorisation may be used or applied for the miner for future transactions, in some embodiments. In addition, advantageously such categorisation may also prompt miners to offer better or more competitive fee quotes for mining a transaction, so that they may be associated with a different or better service level that suits a given client, while adhering to mining the transactions that satisfies the fee quotes, i.e. first seen to mine.

Furthermore, advantageously the service level categorisation allows the clients as well as miners to be able to distinguish between transactions based on service levels. Currently, there exists no mechanisms to distinguish transactions and price different types of transactions for different clients at different rates. In addition, advantageously the above described categorisation based on service levels performed by the payment processor allows or enables such categorisation to be implemented without requiring any modification to the miner node configuration. This is because the proposed mechanism associated with service levels externalises fee evaluation to the payment processor, rather than the miner or validating mode, using the API of the payment processor, and is thus easy to implement, apply to clients and miner, and tremendously aids the scalability of a blockchain such as the BSV blockchain.

In some embodiments, the method comprises the step of verifying the identity of a given miner among the plurality miners providing a respective fee quote, wherein the identity is verified based on a digital signature associated with the given miner. Cryptographic key pairs, including a private key and a public key (or public address) that are associated with each miner, may be used for verifying that the fee quotes are indeed originating from the given miner, i.e. where data signed by a private key can only be recovered or validated using the corresponding public key. Standard public key infrastructure (PKI) techniques may be used and implemented if verification is based on a digital signature.

In other embodiments, an identifier pertaining to the given miner can be used either additionally or alternatively to verify the identity of the miner. In some embodiment the method includes the payment processor, such as a MinerID. In some embodiments said identifier may be associated with a reputation indicator for the given miner. In some embodiment, the MinerID may be based on a mining pool that a given miner is part of or may be specific to the given miner. A reputation indicator relates to the measure of a miner's performance. For instance, in some examples, this reputation may be based on how the given miner has executed or mined transactions in the past at the quoted fee. For example, the reputation indicator may indicate a good reputation, e.g. by being higher in value, if the miner regularly mines transactions at or within an acceptable range of the fees quoted by that miner. In some embodiments, the reputation score or indicator for a miner may be calculated, maintained and managed by at least one payment processor that is communicatively coupled to the miner.

In some embodiments, the method of the first aspect implemented by the payment processor may include the step of validation of the obtained fee quote from a given miner among the plurality of miners based on a miner signature, which is different to the digital signature for verifying the given miner's identity using PKI techniques. The miner signature used by the payment processor for the step of validation advantageously indicates or serves as the miner's commitment to mine the transaction for the respective fee quote that was provided to the payment processor. The presence of the miner signature may also advantageously serve to confirm that the miner will reject any conflicting transactions(s). Accordingly, the step of validating based on a miner signature advantageously acts as a guarantee that the given miner will include the transaction in a block for mining, and that they will not include any conflicting transactions. In some embodiments, monitoring performance of a given miner based on such guarantee(s) offered by the given miner may define or influence the miner reputation or score associated with the given miner.

In some embodiments, the fee quotes provided by each miner among the plurality of miners is provided to the payment processor as a datatype including the value of fee quote. In some embodiments, the datatype is in a JavaScript Object Notation (JSON) object format.

In some embodiments, the received output script from the at least one miner at the payment processor is an Unspent Transaction Output (UTXO) associated with a mempool for the at least one miner, the UTXO including the transaction identifier (TxID) for the blockchain transaction, wherein the blockchain transaction pertains to the digital asset payment between the client and the customer.

In some embodiments, in order for the client to be able to advantageously identify or track blockchain transactions that relate to the given payment transaction with the customer, or any transaction associated with the client, the method comprising the steps of sending a request to the plurality of miners for obtaining a corresponding blockchain transaction for the transaction identifier, this request being sent by the payment processors to at least one miner responsive to a status query associated with a transaction identifier from the client. In response, the payment processor obtains the corresponding blockchain transaction previously generated from at least one miner among the plurality of miners. Based on the mining status of the blockchain transaction by the at least one miner, the method includes the step of sending a status result pertaining to the obtained blockchain transaction, associated with the transaction identifier to the client. The result may indicate if the blockchain transaction has been mined, i.e. completed, or rejected for some reason, or is invalid because it may have been already mined by another miner among the plurality of miners before this given miner.

This advantageously avoids a double spend in case the mining has been done for a particular transaction by a different miner. In some embodiments, the miner can maintain transactions that it has not added to a block or mined in a secondary mempool, which may be or behave as an alternative or additional mempool, separate to a primary mempool associated with the miner. The secondary mempool may be a temporary mempool such that the TxIDs can be checked for a double spend. This advantageously ensures that even though the transaction is not mined by a given miner, it is still kept in the secondary mempool and used to check against and reject double spends in the future. There may be a time limit to holding a transaction that is not mined or intended for mining by a given miner in the secondary mempool of the given miner. In some embodiments, transactions stored in the secondary mempool may be associated with a time of expiry, after which they will be purged. In some embodiments, there may be a separate fee associated with the miner for storing transactions that are not mined by the given miner in its respective secondary mempool. As mentioned above, in cases where there the fee quotes are categorised into service levels, the secondary mempool is associated with miner that offer double spend protection.

In some embodiments, as mentioned above the request from the client may be to query the status of multiple transactions together in a batch, rather than a single transaction each time. Similar to the submission of multiple transactions to the blockchain for mining; querying multiple transactions together in a single status query request is advantageous, especially if the client may be a merchant entity that processes or handles a large number of transactions and has submitted multiple transaction to be processed in one go. This advantageously allows the system to seamlessly scale in accordance with the client's requirements and can be based on the amount of transactions and/or customers handled by the client. If there are multiple transactions, the payment processor may be associated with separate endpoints for querying multiple transactions in some embodiments. In other embodiments, the same endpoint for payment processor is used for requests from the client for querying single as well as multiple transactions.

In some embodiments, the method of the first aspect further comprises the step of providing an application programming interface (API) converter, associated with the payment processor for performing the steps of receiving the first request for fee quotes, second request for submitting transactions associated with a digital asset payment for a client, and/or status query for the transaction from the client in a Hypertext Transfer Protocol Secure (HTTPS) format; and then converting these to a Remote Procedure Call (RPC) format, before sending the RPCs to the plurality of miners. This is advantageous as it allows the client to communicate requests associated with the blockchain via HTTPS, using a web-based API and seamlessly providing interoperability with the plurality of miners that do not communicate using Internet protocol communication standards for web services. For instance, all present BSV miners or implementations use remote procedure call. The API convertor implemented in this embodiment is not limited to HTTPS to RPC and vice versa conversion, or other web-based protocols to alternative communication protocols supported by individual miners, or networks for a given cryptocurrency or digital asset that can also be envisaged. In the reverse flow path, the method of the first aspect also includes receiving responses associated with the corresponding blockchain transaction from one or more miners among the plurality of miners in an RPC format, and accordingly converting the respective responses using HTTPS for the client. Thus, advantageously implementing the proposed interface by the payment processor enables seamless communication for submitting transactions to the blockchain when the clients (payees) and miners use different wireless data communication protocols and mechanisms.

In some embodiments, an API Gateway associated with the payment processor may be provided. The above mentioned API converter may be associated with the API Gateway in such embodiments. In addition, the API Gateway may also in some embodiments be implemented in one or more computing devices to perform/be responsible for functions including, but not limited to one or more of:

Caching of transactions

Performing resilience functions in case of miner node failures

Keeping a record of one or more endpoints or URLs that may be used for sending messages or notifications to/from the payment processor and/or client and/or miner node Providing resilient features to include keeping track of transactions that for some reason failed to submit. In some examples, this may be the inclusion of a configurable parameter held at, or set by the payment processor; as well as a mechanism to purge those tracked transactions that have expired. The API Gateway may also be associated with functionality for re-submit transactions in failure scenarios, thereby providing functionality for error handling of genuine transactions, and differentiating against double spends.

In accordance with a second aspect, the present disclosure provides a method for processing transactions associated with a blockchain, the method implemented by one or more processors associated with a client, the client being communicatively coupled to at least one payment processor implementing a payment service for the client. In some embodiments, the payment processor is configured to implement the method of the first aspect set out above and the associated embodiments. The method of the second aspect implemented by the client, i.e. the merchant, comprises the steps of sending a first request to a payment processor among the at least one payment processors, the request pertaining to one or more fee quotes for mining a transaction or a plurality of transactions to be obtained from a plurality of miners, via the payment processor. As mentioned above, the fee quotes obtained relate to mining any transactions, or may be particular to a given transaction relating to a digital asset payment from a customer. As mentioned above, the first request may also indicate a service level required for the mining.

In some embodiments of the second aspect, responsive to receipt of one or more fee quotes from the payment processor, the method includes selecting a fee quote among the one or more received fee quotes. As mentioned in the first aspect, the selected fee quote may or may not be based on a recommendation made by the payment processor. The method of the second aspect then comprises requesting and/or processing the digital asset payment from the customer, the request associated with the selected fee quote. In some embodiments, this request is akin to a payment request or an invoice issued by the client to a customer for a digital asset payment. For example, the client may be a coffee shop terminal associated with a digital wallet, and the customer may be paying, for instance, 2 satoshis for a coffee in response to this request, the customer also associated with a digital wallet. As the selected fee quote is now chosen, this may be added to the request for payment from the customer. The method then includes submitting a second request for a given transaction, associated with the customer payment mentioned above to the payment processor, the submission being based on the selected fee quote for mining the given transaction. In some embodiments the selected fee quote is clearly indicated or included in the second request, so that the payment processor is advantageously able to identify the miners that can mine the transaction at, or below the selected fee quote, or additionally, or alternatively for the miners to be able to identify if they satisfy the selected fee quote of not.

As mentioned above, in some embodiments the client may select a fee quote based on the value of the highest fee quote received from the payment processor, or may be at, or near the average or median, of the value of the received fee quotes. The advantages associated with either option are the same as discussed above, i.e. a maximum value allowed all miners to have a chance to mine, and other values will limit mining to some miners that meet the fee quote by being able to mine a transaction either at the selected quote, or lower, while those miners that cannot mine the transaction (as the quote was too high, for instance), can still maintain a record of the blockchain transaction in a temporary storage, such as a secondary mempool, so that this can be used to verify against any double spends for the given transaction.

In some embodiments of the second aspect, the method also includes receiving a transaction identifier for a blockchain transaction that has been generated by at least one miner, the blockchain transaction corresponding to the submitted transaction, i.e. the transaction between the client and the customer. In some embodiments, the method includes sending a status query associated with the obtained transaction identifier; and obtaining a status result for the blockchain transaction, corresponding to the transaction identifier.

The advantages associated with the second aspect are related to those discussed above in relation to the first aspect. The second aspect is complementary to the first aspect, but depicts the method implemented by the client, requesting a transaction to be written into the blockchain. The client implementing the method of the second aspect may in some embodiments be in communication with at least one payment processor, configured to implement payment service as a payment API according to the method of the first aspect.

In addition, the method of the present aspect advantageously allowing the clients to select a fee quote to provide to the payment service, which provides the client or merchant control, or certainty of influencing that their transaction will be mined at a given mining fee in a timely manner, thereby providing increased security, interoperability, reliability, efficiency and timeliness for transactions mined for a client making use of the proposed payment service or payment API.

As mentioned above, since the payment service implemented by the payment processor is an API, in some embodiments the first request and/or the status query from the client is a HTTPS GET request, and wherein the second request is a HTTPS POST request. Thus advantageously, standard Internet and web-based communication protocols can be used by the client to request for a transaction to be mined into a blockchain. In some embodiments, data associated with the first and/or second request, and/or the status query from the client, is provided in a JavaScript Object Notation (JSON) object format.

In accordance with a third aspect, the present disclosure provides a computer implemented method for processing transactions associated with a blockchain, the method implemented by a one or more processors associated with a miner among a plurality of miners, wherein the plurality of miners being communicatively coupled to at least one payment processor implementing a payment service for a client. In some embodiments, the payment service is implemented by the payment processor based on the methods described above in association with the first aspect. In some embodiments, the client is configured to implement the methods associated with the second aspect as discussed above. The method of the third aspect, as implemented by a miner among a plurality of miners, comprises the steps of providing a current fee quote pertaining to the miner for mining a transaction in the blockchain, responsive to a first request for a fee quote for a transaction associated with the client. In some embodiments, the fee quote may be provided as a data type for the payment processor associated with the client. As discussed above, the first request may relate to a request for a current fee quote for any transaction or a plurality of transactions or may be specific to a particular transaction between the client and a customer.

In some embodiments of the third aspect, responsive to a second request from the payment processor on behalf on the client, the second request relating to submitting a given transaction in the blockchain, the given transaction based on a selected fee quote, where the section may be done by the client as set out in the first and second aspects, the method comprises the following steps. Based on a determination that selected fee quotes associated with the given transaction satisfies the current fee quote for the miner, i.e. that the selected fee quote is at or within the current fee quote, the given miner then generates a corresponding blockchain transaction associated with the given transaction. The method also includes generating an output script (UTXO) for the created blockchain transaction, adding the generated output script to a mempool associated with the miner, and sending the output script to the payment processor, wherein the output script incudes a transaction identifier TxID, associated with the corresponding blockchain transaction. In some embodiments, responsive to a request for a status associated with the transaction identifier, the miner includes returning a result based on a current mining status of the corresponding blockchain transaction.

The advantages associated with the third aspect are as related to those discussed above in relation to the first and second aspects. The third aspect is complementary to the first and second aspect, but depicts the method implemented by a miner among the plurality of miners, coupled to the payment processor for constructing a transaction for the client, that can be written into the blockchain. The miners implementing the method of the third aspect may in some embodiments be in communication with at least one payment processor, configured to implement payment service as a payment API according to the method of the first aspect.

In some embodiments, the step of providing the current fee quote, and/or the step of sending the output script, and/or the step of returning the result, are implemented as a Remote Procedure Call (RPC). This is advantageous, if for instance, like the BSV Bitcoin network, the miners are configured to correspond wireless via RPCs. In some embodiments, the method of the third aspect may include the step of sending the RPCs from the miner to a node connector, and optionally a firewall for the plurality of miners, before propagating through a wireless communication network to the payment processor for the client, for additional security and streamlining of data flow among the miner pool or network, i.e. the plurality of miners associated with the payment processor. Furthermore, advantageously, the node connector may provide a secure communication channel between an API Converter, associated with the payment processor, and one or more miners in the pool.

In some embodiments, based on a determination that the selected fee quote associated with the given transaction does not satisfy the current fee quote for the miner, for instance if the current fee quote is higher than the selected fee quote, the method includes adding an output associated with the blockchain transaction to a secondary mempool, which may be an additional temporary mempool associated with the miner. As mentioned above, this may be stored herein for a certain predefined period of time so that the miner node may use such temporary entry to check and advantageously ensure that there are no double spends associated with the given transaction.

The present disclosure also provides a computer system comprising a payment processor communicatively coupled to at least one client and at least one miner via a wireless communication network, the payment processor associated with an API convertor for conversion of HTTPS requests from the client to RPC requests for the miners, and vice versa, whereby the payment processor is implemented in accordance with the first aspect. The computer system also comprises a client communicatively coupled to the payment processor via the wireless communication network and being capable of communication with at least one customer, whereby the client is implemented in accordance with the computing device of the second aspect. The computer system also comprises a plurality of miners, each miner communicatively coupled to the payment processor via the wireless communication network, whereby each miner is implemented in accordance the third aspect.

In some embodiments a computing device comprising a processor and memory is provided, the memory including executable instructions that, as a result of execution by the processor, causes the device to perform the aspects and/or the embodiments discussed above.

In some embodiments, a computer-readable storage medium is provided, having stored thereon executable instructions that, as a result of being executed by a processor of a computer system, cause the computer system to perform the method of the aspects and/or the embodiments discussed above.

Some specific embodiments are now described by way of illustration with reference to the accompanying drawings, in which like reference numerals refer to like features.

First Aspect—Payment Processor

FIG. 1 relates to the first aspect of the present disclosure and depicts a method performed by a payment processor for implementing a payment service for a client, as discussed above. The payment processor is communicatively coupled to a client or a plurality of clients, and also coupled to a plurality of miners which may include more than one networks of miners or more than one mining pool. In some embodiments, the payment processor may be part of or implemented in association with the client. This is true if the client is a computationally sophisticated merchant point of sale (POS) terminal. The aspects and embodiments of the present disclosure are envisaged to cover both such implementations, i.e. a remote payment processor or one that is part of the client. An example system architecture is seen in FIG. 4 which is explained later herein.

In the example scenario depicted in FIG. 1, the embodiments relating to the steps of obtaining a plurality of mining fee quotes, submitting a transaction based on a selected fee quote among the obtained plurality of mining fee quotes, as well as sending a status query relating to a transaction identifier are all described as taking place in sequence and described as a single process in the flowchart of FIG. 1. However, the present disclosure and first aspect is not to be considered so limited. The steps relating to obtaining fee quotes in a first request in steps 102 to 106 described below may be implemented separately and independently of the remaining steps. Similarly, the steps relating to submitting a transaction in the second request from steps 108 to 114 may be implemented separately, and at a different time to the earlier steps of obtaining fee quotes. In the same way, the steps relating to a transaction status enquiry from step 116 onwards may be implemented at any time after the client has been made aware of the transaction's identifier and do not need to follow the sequence of FIG. 1. All steps are shown in sequence herein simply for ease of explanation and understanding and under no circumstances is the present disclosure to be considered limited to such sequence or scenario.

Step 102 depicts receiving a first request from a client for mining fee quotes associated with mining a transaction in a blockchain. As mentioned earlier, the first request may also be in relation to a plurality of transactions. For ease of explanation and understanding, FIG. 1 will be explained in relation to a single transition in the first request associated with the client, but the present disclosure is not so limited in any way. This step signifies the collection of mining fee quotes from a plurality of miners for mining a transaction on behalf on the client. The transaction is usually related to a digital asset payment taking place between the client, i.e. a merchant computing resource or entity, and a customer entity. As mentioned above, the first request is received via or using the HTTPS protocol, and in a JSON format from the client. The payment processor implements a payment interface as an application programming interface (API) for the client, and therefore can accept and process HTTPS as the API is implemented as a web service. The API endpoint is made available to the client. In the case of multiple transactions in the first request, either the same API endpoint, or a separate API endpoint for the payment processor may be used.

For example, in some embodiments the payment processor can implement the payment service using a standards-based interface design such as a REST interface. REST (Representational State Transfer) is an architectural style for developing web services and web-based interactions. REST API design standards can process HTTPS requests and communication using the following commands:

| Commands | GET | POST | PUT | DELETE |
|---|---|---|---|---|
| Resource | read | create | update | delete |

GET and POST HTTPS requests will be mostly discussed herein, but the application is not limited to these commands. In this step 102, the first request that is received by the payment processor may be a HTTPS request of the form GET getFeeQuote.

A resource in the context of REST API is an object with a type, associated data, relationships to other resources, and a set of methods that operate on it. In some embodiments, the payment service is provided by the payment processor as an API implementation to access the state of a blockchain or distributed ledger, such as the Bitcoin SV (BSV) blockchain, and to trigger operations that can alter that state, via an application interface, and expose it as a REST API. Thus, the payment processor may be considered as a REST endpoint for one or more clients. For ease of explanation alone, one client (or merchant) and one payment processor will be discussed throughout, but the present disclosure is not so limited. The client can thus communicate with the payment service via HTTPS and furthermore the client may have anonymous access to the payment processor, or the payment service implemented by the payment processor, advantageously. When there are more than one client and more than one payment processor, the client in some embodiments will be responsible to target or contact the correct or intended Payment Processor or REST endpoint based on for instance any agreement that the client may have with one or more third parties that run Payment Processor.

Step 104 depicts obtaining a fee quote from each miner among a plurality of miners for mining the transaction. In this step, all miners coupled to the payment processor may be polled or contacted by the payment processor and asked to return a current fee quote for mining a transaction, i.e. writing the transaction to the blockchain after validating the locking and unlocking scripts. Presently, some blockchain networks such as the BSV network support communication via Remote Procedure Calls (RPC). Therefore in this case an API Converter associated with the payment processor is used to convert HTTPS first request, i.e. GET getFeeQuote, to an RPC first request, i.e. RPC getFeeQuote( ) and vice versa. Such a conversion is necessary in embodiments that need to support such BSV node implementations or other implementations that only support RPCs. As mentioned above, the API Converter may be part of an API gateway or gateway processor associated with the payment processor, where HTTP/RPC conversion is just one of the functionalities offered by an API gateway. The purpose of the getFeeQuote( ) in an RPC format sent to the miners is to inform the client of fees charged by each miner. No input parameters are required, but an RPC interface may need to be implemented in relation to the RPC getFeeQuote( ) so that this command returns a datatype from each miner in the form of a JavaScript Object Notation JSON object, i.e. MinerFeeQuote, that contains fee-related data collected from each miner.

The data relating to the obtained fee quotes collected from each miner may be defined as JSON objects, as given in the below examples.

The JSON object FeeQuotes returned from each miner is shown below. Although examples relating to a single transactions are shown, the present disclosure is not so limited and the same applied for fee quotes representing mining fees for multiple transactions:

```
[
    {
    # MinerFeeQuote
    "MinerID" : <Alphanumeric>,              # If MinerID is null (empty) then "NO-ID" is
    defaulted
    "CurrentHighestBlockHash" : <Alphanumeric>,
    "MinerSignature" : <Alphanumeric>,       # Includes Current Block Hash + Block Height
    "SignatureTimestamp" : <UTC Timestamp>, # Miner guarantees fee from this time until
    superseded
    "MinerReputation" : <Alphanumeric>,         # If this is blank (null), return "Unknown"
    [
        {
            # FeeTypes
            "FeeType" : <"SPB" || "SPDB" || ...>, # Satoshis-per-byte, Satoshis-per-data-byte,
            etc
            "CurrentFee" : <Floating Point Number>,
                "Expiry" : <Integer>, duration or date/time at which Fee expires,
                "FeeOnExpiry" : <Floating Point Number>, # If Expiry is 0 then this should be set
    to
            CurrentFee
            "GuaranteeFee" : <Floating Point Number> # Guarantees to process Tx at this fee
            (none if 0)
            "KeepInMempoolFee" : <Floating Point Number>, # Fee for retaining Tx in secondary
    mempool
        },
            {...}
    ]
    "Margin" : <Floating Point Number>, # Acceptable margin for error due to use of FP
    numbers
    "APIversion" : <Numeric>             # API version NN.nn (major.minor version no.)
    },
    {
        # MinerFeeQuote
    "MinerID" : <Alphanumeric>,              # If MinerID is null (empty) then "NO-ID" is
    defaulted
    "CurrentHighestBlockHash" : <Alphanumeric>,
    "MinerSignature" : <Alphanumeric>,       # Includes Current Block Hash + Block Height
    "SignatureTimestamp" : <UTC Timestamp>, # Miner guarantees fee from this time until
    superseded
    "MinerReputation" : <Alphanumeric>,         # If this is blank (null), return "Unknown"
    [
        {
        # FeeTypes
                "FeeType" : <"SPB" || "SPDB" || ...>, # Satoshis-per-byte, Satoshis-per-data-byte,
    etc
                "CurrentFee" : <Floating Point Number>,
            "Expiry" : <Integer>, duration ordate/time at which Fee expires, if 0 fee is not
    guaranteed to not change
            "FeeOnExpiry" : <Floating Point Number>, # If Expiry is 0 then this should be set to
    CurrentFee
            "Guarantee Fee" : <Floating Point Number>   # Guarantees to process Tx at this fee
    (none if 0)
```

-continued

```
        "KeepinMempoolFee" : <Floating Point Number>, # Fee for retaining Tx in
secondary mempool
    },
    {....}
]
"Margin" : <Floating Point Number>, # Acceptable margin for error due to use of FP
numbers
"APIversion" : <Numeric>              # API version NN.nn (major.minor version no.)
    },
MinerFeeQuote may repeat as necessary - one per miner
]
```

The JSON FeeQuotes object in some embodiments contains an array of miner details and fees charged, whilst MinerFeeQuote is a JSON structure containing miner and fee data received from a single miner. Some of the terms in the JSON objects above explained below.

CurrentHighestBlockHash may be used as a marker to identify the block hash at the point where the blockchain had grown to when getFeeQuote( ) was called.

MinerSignature may contain the signature of the miner who agreed to guarantee this transaction, as discussed above. This is different to a digital signature used to verify the identity of a miner. By doing this, a miner may guarantee that the miner will include the transaction in a block soon and optionally will not include any conflicting transactions. If a miner is not willing to guarantee a transaction, then this may be set to Null.

SignatureTimestamp indicates the time at which the miner guarantees to mine a transaction at the stated current fee i.e. the fee is guaranteed from that point onwards until superseded. This time is superseded if the client makes a subsequent call to getFeeQuote( ).

MinerReputation relates to the measure of a miner's performance i.e. how well does a miner execute transactions at the promised or quoted current fee. The reputation score/indicator may be calculated, maintained and managed by each payment processor.

Miner ID may be a two-part datum that is added to a coinbase transaction when a block is mined. If there is no Miner ID present, the payment processor may tag that miner with a Miner ID of "NULL" or simply left blank.

Within each MinerFeeQuote, an array of FeeTypes objects may be used to capture the various fee types that are currently available. Fee types can be introduced in the future without any change required to the getFeeQuote( ) interface provided by the payment processor. All transactions may have one FeeTypes array.

Step 106 depicts providing the obtained fee quotes to the client by the payment processor. This may include a recommended fee quote determined by the payment processor, in some embodiments. As mentioned above in relation to the first aspect, this step may include a conversion from RPC to HTTPS by an API converter, so that the client will be able to access the details using the web-based API.

In step 108 a second request is received from the client, the second request being a request to submit a given transaction pertaining to a selected fee quote among the obtained fee quotes. The given transaction in some embodiments is based on a digital asset payment that is made to the client by a customer in response to a payment request from the client. For instance, this may satoshis or other types of digital asset payment in return for a cup of coffee if the client is a merchant terminal in a coffee shop. In this step, the client requests via the payment service API implemented by the payment processor that this digital asset payment is written into the blockchain.

As mentioned above, the second request from the client may in some embodiments be a request to submit multiple transactions. Requests relating to submitting multiple transactions may be sent to the same payment processor API or another endpoint that is associated with the payment processor. All endpoints associated with the payment processor will be made known to or provided to the client. The selected fee quote in the case of multiple transactions may be associated with either mining all of the multiple transactions, i.e. the selected fee is 10 satoshis for mining the 10 transactions in the batch of multiple transactions; or the fee selected for mining each of the multiple transactions for the selected fee quote, i.e. the selected fee is 1 satoshis/transaction for mining each transaction among the 10 transactions in the batch.

In the case of multiple transactions, the body of the second request may be in the form an array of raw transactions. This endpoint is used to send multiple raw transactions to a miner for inclusion in the next block that the miner creates.

An example format of the Request body is shown below:

```
POST /mapi/txs
[
        "010000000135ff04d97f7f5d214b66dcc401cee7967c.......",
        "0100000001569c0e1df6cdbbc99bdfbc25dc153ce5e........",
        "etc                                         ..."
]
The example response may be:
{
    "apiVersion":"string",
    "timestamp":"string",
    "errorCount":"integer (count of where txn returnResult <> success)",
    "txs":[
        {
            "txid":"string",
            "minerid":"string | null",
            "returnResult":"string",
            "resultDescription":"string",
            "currentHighestBlockHash":"string",
            "currentHighestBlockHeight":"integer",
            "txSecondMempoolExpiry":"string",
            "confirmations": "integer (0 for unconfirmed)"
        }
    ]
}
```

The selected fee quote in the second transaction may be based on a recommendation made by the payment processor or may be selected by the client for one or more transactions.

As mentioned above, the selected quote may be based on an average value or the maximum value of all obtained fee quotes.

As mentioned above, in some embodiments the selected fee quote may be one that is based on a service level, where the obtained fee quotes are categorised into service levels by the payment processor.

In some embodiments, the fee for mining as well as the features/functionalities that are to be associated with each service level can be predefined by the payment processor. Then, based on a given client's requirements a service level and associated fee for mining (the selected fee quote), may be assigned for that client. The client requirements may be based on the types of transactions that the client handles. The service level may be preassigned or pre agreed, for instance based on an external service level agreement. Thus preassignment may be based on the priority associated with the transaction and the level of protection against double spends offered by the miner(s) that satisfy the selected fee quote/service level.

Thus, the fee associated with a service level for the transaction to be mined may be predefined by the payment processor and agreed with the client. If a service level or fee has not been selected by the client, then details of the obtained fee quotes categorised into service levels with each associated with its respective fee may be provided to the client for selection.

Alternatively, it is also possible for the service level and the associated fee be recommended by the payment processor as the selected fee quote. Such recommendation of the service level may be based on learned data and statistics from earlier transactions associated with that client. Or, in some cases, the recommendation is provided by the payment processor based on input from the client.

As mentioned above, in some embodiments the service levels are assigned to miners based on the obtained fee quote and the minimum possible fee, i.e. the relay fee, for a miner for mining one or more transactions. Thus, advantageously different fees can be applied for different transaction types or use cases. The type of transaction or service requirements may in some embodiments be obtained by the client.

The service levels may also be determined straightaway by the payment processor based on knowledge of the transaction fee quotes obtained from the miner and knowledge of the relay fee for the miner. This enables the payment processor to classify fees, and optionally even recommend fees for the client, whether or not the client has indicated a minimum service level. Once it obtains the fees, the payment processor may inform the client of the service level that can be expected from any selected/recommended fee for the transaction. These may include attributes associated with the service level.

The below table provides an example of a matrix that may be used by the payment processor to classify fees in service levels(SL) 0-4 based on relay fee and transaction (txn) fees. The units for the fees in this example is expressed in satoshis per byte, however the present disclosure is not so limited. This may be expressed in satoshis per data byte for some transactions. Other digital asset or cryptocurrencies can be used. This matrix may be stored in a static or dynamic configuration file or entry associated with the payment processor, so that the service level can be categorised based on this logic.

In the below example, two features have been considered for the service levels (i) the priority of the transactions and (ii) the protection offered against double spends. However, the present disclosure is not so limited, and the service levels can be based on other features and attributes.

| Miner | relay fee | txn fee | Service level |
|---|---|---|---|
| 0 | <0.20 | <0.3 | SL0 |
| 1 | 0.20 | 0.3 | SL1 |
| 2 | 0.25 | 0.4 | SL2 |
| 3 | 0.25 | 0.5 | SL3 |
| 4 | >0.25 | >0.5 | SL4 |

Whereby in this example:

For Service Level (SL) 0, i.e. SL0—No miner guarantees to mine and no double spend protection where minRelayrfee <0.20 satoshis, i.e. No guarantee of any service for mining. There is no additional double spend protection as the fee does not cover including transactions that will not be mined in a secondary mempool for checking against double spends.

SL1—Low priority, no double spend protection, if (minRelayrfee)=<0.20 satoshis and (txnfee)=<0.3 satoshis, i.e. the transaction may not be prioritized for mining over other transactions in a mining queue, and thus may not be mined for another 24 hours or so (for example). There is no additional double spend protection as the fee does not cover including transactions that will not be mined in a secondary mempool for checking against double spends.

SL2—Median priority, double spend protection present, if (minRelayrfee)=0.25 satoshis and (txnfee)=<0.4 satoshis, i.e. the transaction is prioritized over some, but not all or most of the other transactions in a mining queue, and thus may be mined within a 12 to 24 hours period or so (for example). There is additional double spend protection as the fee does cover including transactions that will not be mined in a secondary mempool, which will be used to check against double spends.

SL3—High Priority, double spend protection present if (minRelayrfee)>=0.25 satoshis and (txnfee)=0.5 satoshis, i.e. the transaction is prioritized over most of the other transactions in a mining queue, and thus may be mined within a 12-hour period or so (for example). There is additional double spend protection as the fee does cover including transactions that will not be mined in a secondary mempool, which will be used to check against double spends.

SL4—Highest priority, all miners will mine, full double spend protection where the txnfee>0.5 satoshis, i.e. the transaction is prioritized all the other transactions in a mining queue, and thus may be mined within 2-hour period or so (for example). There is additional double spend protection as the fee does cover including transactions that will not be mined in a secondary mempool, which will be used to check against double spends.

In this case, the above mentioned JSON object FeeQuotes set out in step 104 may also include:

```
[
  {
    # MinerFeeQuote
    "minerID" : <Alphanumeric>,    # Null indicates no minerID
    "currentHighestBlockHash" : <Alphanumeric>,
```

-continued

```
"currentHighestBlockHeight" : <Alphanumeric>,
"timeStamp" : <UTC timestamp>,    # Fee timestamp
"minerSignature" : <Alphanumeric>,    # Includes Current Block Hash + Block Height
"minerReputation": <Alphanumeric>,    # Can be Null
[
    {
      # FeeTypes
      "feeType" : <"SPB" || "SPDB" >, # Satoshis-per-byte, Satoshis-per-data-byte, etc
      {
# currentFee # Fee unit tuple (x satoshis / y bytes)
"satoshis" : <Unsigned Integer>
"bytes" : <Unsigned Integer>
      }
      "expiry" : <Integer>, expiry datetime as set by miner
      "feeOnExpiry" : <Floating Point Number>, # If expiry is 0 then this should be set to
currentFee
      "keepInMempoolFee" : <Floating Point Number>, # Fee for retaining Tx in secondary
mempool
      "mempoolExpiryFee" : <Floating Point Number>, # Fee once keepInMempoolFee expires
    },
      {...}
]
{
# Service Level
"service level": <Unsigned Integer>
"SLDescription": <String>
}
"apiVersion" : <Numeric># Merchant API version NN.nn (major.minor version no.)
      },
```

In some embodiments, the second request is a HTTPS request in the form of POST submitTransaction(Tx), where Tx is in some embodiments an object in a JSON format associated with the given transaction for payment between the client and the customer. Thus the Tx (JSON object) contains data required to create a transaction on the blockchain that the client may provide or construct as a JSON structure prior to submitting the second request to the payment processor to pass on to the miners.

Step 110 depicts the step of sending a request to one or more miners among the plurality of miners for generating a blockchain transaction corresponding to the given transaction in step 108. In this step, the payment processor in some embodiments converts the HTTPS POST request in the previous step to an RPC request for submission to the miners. This may be done with the request RPC createRawTransaction(Tx), where Tx includes data associated with the given transaction, given as a JSON object as discussed in step 108. The RPC createRawTransaction(Tx) is an RPC call to create a transaction spending given inputs and creating new outputs, where outputs can be addresses or data. The RPC request may be sent to the plurality of miners, or to the miners that meet or satisfy the selected fee quote from the client in step 108. As mentioned above, miners that have provided current fee quotes at or below the selected fee quote are considered to satisfy the requirement of the selected fee quote, as they can mine the transaction at their respective current quoted fee. In response, a miner that satisfies the selected fee quote creates a blockchain transaction corresponding to the given transaction. In some embodiments, a hex-encoded raw transaction corresponding to the given transaction is returned to the payment processor.

In step 112 an output or output script associated with a corresponding blockchain transaction that has been created by at least one miner among the plurality of miners that satisfies the selected fee quote is received at the payment processor. The output script may be a UTXO associated with the corresponding blockchain transaction created by the respective miner. In some embodiments, the UTXO may also be stored in a mempool of the respective miner that satisfies the selected fee quote. The output in this step will include a transaction identifier (TxID) for the corresponding blockchain transaction created by the respective miner. TxID is the reference to the hex-encoded transaction that is submitted to the mempool of the miner, which is then accordingly mapped by the payment processor to the blockchain transaction.

This blockchain transaction may then be mined either instantaneously or at a later time to complete the mining process at the current fee quote. In some cases the created transaction may not be mined because another miner has written it into the blockchain or may be pending or rejected for some reason such as a double spend or time-lapse or invalidity.

Step 114 depicts the sending a transaction result TxResult to the client, the result including a transaction identifier TxID for the blockchain transaction that was created corresponding to the given transaction in step 108 by a respective miner. In some embodiments, the transaction result TxResult is a JSON object that is sent to the client using the HTTPS protocol from the payment processor, based on details of the corresponding blockchain transaction created by a respective miner that satisfies the selected fee quote in steps 110 and 112.

An example of the details present in the TxResult object for the client is given as follows:

JSON object TxResult is shown below for the respective miner and includes some terms and objects that were discussed as part of the FeeQuotes JSON object in step 104.

[

-continued

```
{
"ReturnResult" : <Alphanumeric>,    # ReturnResult is defined below
"ResultDescription" : <Alphanumeric>,       # Reason for failure (e.g. which policy failed and
why)
"DoubleSpendTxID" : <Alphanumeric>,        # Tx ID of double spend transaction
"ExceptionTimestamp" : <UTC Timestamp>, #Time exception was detected (e.g. doublespend
time)
"BlockHash" : <Alphanumeric>,                     # Block that includes this transaction
"BlockHeight" : <Integer>,
"MinerID" : <Alphanumeric>,        # If MinerID is null (empty) then "NO-ID" is defaulted
"MinerSignature" : <Alphanumeric>,        # Block Hash + Block Height + TxID
"SignatureValidFrom" : <UTC Timestamp>, # MinerSignature validity time (from getFeeQuote)
"TxID" : <Alphanumeric>,                  # Transaction ID assigned when submitted to
mempool
"txSecondMempoolExpiry" : <Integer>, # Duration (minutes) Tx will be kept in secondary
mempool"
"APIversion" : <Numeric>          # API version NN.nn (major, minor version no.)
    }
]
```

ReturnResult set out above may contain one of the following possible values, which are as follows:

Submitted—no issues, transaction submitted to mempool

Rejected_DS—rejected due to double spend—DoubleSpendTxID cannot be Null

Rejected_Policy—rejected due to policy violations

Rejected_Invalid—rejected due to transaction being invalid

Rejected_FeeTooLow— Fee is too low, so miner will not include Tx in a block

Rejected_KeepinMemPool— Tx is rejected but kept in mempool to check for double spends.

In the case where there are multiple transactions associated with the client and submitted together using the same or a separate endpoint associated with the payment processor, the response body returned to the second request may be in the below JSON format:

```
{
    "payload": "{\"apiverison\":\"1.0.1\",\
    "timestamp\": .....................................},
    "signature": "30456598f65............",
    "publickey": "03fcfcfcfcfd08433fc.......",
    "encoding": "UTF-8",
    "mimetype": "application/json"
}
```

In some embodiments, for multiple transactions submitted in the second request, the response body provides for the following:

The response groups Header info and Transaction level (payload) information

The response reports on a returned Result (or present status) for each transaction.

The response returns error count: count (returnResult < > success)

The response returns an Error threshold, where further processing of the transaction is halted and all of the multiple transactions submitted in the second request are rejected if error count >than X, where X a configurable parameter, which may be predefined or dynamically defined. If a batch of multiple transactions submitted together in the second request is rejected for mining by a miner due to error count being greater than X, an error code may be assigned with an appropriate description of the code.

The JSON envelope terms are set out below with an explanation of their function:

| field | function |
| --- | --- |
| payload | main data payload - based on transaction level information |
| signature | signature on payload string |
| publickey | Public key to verify signature |
| encoding | encoding type |
| mimetype | multipurpose internet mail extensions type |

An example of the payload or message field return is given below:

```
{
    "apiVersion":"string",
    "timestamp":"string",
    "errorCount":"integer (count of where txn returnResult <> success)"
    "txs":[
        {
        "txid":"string",
        "minerid":"string | null",
        "returnResult":"string",
        "resultDescription":"string",
        "currentHighestBlockHash":"string",
        "currentHighestBlockHeight":"integer",
        "txSecondMempoolExpiry":"string",
        "confirmations": "integer (0 for unconfirmed)"
        }
    ]
}
```

Step 116 depicts the step of receiving a status query associated with a transaction identifier TxID from the client for sending on to the plurality of miners. This step onwards may take place asynchronously to the above steps of arranging to submit a transaction after selecting a fee quote among a plurality of mining fee quotes and is not to be considered essential to the operation of the first aspect. The embodiments from step 116 onwards relate to a scenario where the client wishes to know the status of one or more second requests made in step 108. Step 116 enables the client to query the status of the transactions that the client has submitted to the payment processor via the HTTPS POST submitTransaction(Tx) discussed in step 108. Thus, the TxID in this step can correspond to any second request made for any given transaction that relates to a digital asset payment between the client and its customers. As discussed in the above steps, the status query is received from the client using HTTPS as a transmission protocol, the query being sent in a JSON format, such as GET queryTransactionStatus(TxID), which is in turn converted to an RPC request, RPC getRawTransaction(TxID) for sending to one or more miners among the plurality of miners.

If multiple transactions were submitted by a client in the second request, as mentioned above, in some embodiments the status of multiple transactions may be queried by the client in a single query transactions status request, rather than sending separate requests for each transaction.

payment processor by a miner via a ReturnResult and ResultDescription objects. These objects have been indicated in relation to step 114.

In step 120, a TxResult pertaining to the TxID is returned to the client, the response being sent using HTTPS. This represents a mining result that is associated with a given TxID sent by the client in the status query in step 116. An example of the TxResult sent to the client from the payment processor is given below.

```
JSON object TxStatus is shown below:
[
    {
    "ReturnResult" : <Alphanumeric>,          # ReturnResult is defined below
    "ResultDescription" : <Alphanumeric>,     # Reason for failure (e.g. which policy failed
    and why)
    "DoubleSpendTxID": <Alphanumeric>,        # Tx ID of double spend transaction
    "ExceptionTimestamp": <UTC Timestamp>,# Time exception was detected (e.g.
    doublespend time)
    "BlockHash" : < Alphanumeric>,
    "BlockHeight" : <Integer>,
    "Confirmations" : <Integer>,          # 0 if not yet unconfirmed
    "MinerID" : <Alphanumeric>,          # If MinerID is null (empty) then "NO-ID" is defaulted
    "MinerSignature" : <Alphanumeric>,          # Block Hash + Block Height + TxID
    "SignatureValidFrom" : <UTC Timestamp>, # MinerSignature validity time
        "APIversion" : <Numeric>          # API version NN.nn (major.minor version no.)
    }
]
```

Requests relating to querying the status of multiple transactions may be sent to the same payment processor API or another endpoint that is associated with the payment processor. All endpoints associated with the payment processor will be made known to or provided to the client This may be provided at the time of a client registering for services associated with the payment processor. As mentioned above, known Open API tools such as Swagger may be used for providing the APIs to the client.

In the case of multiple transactions queried, the body of the second request may be in the form an array of transaction identifiers (TxIDs). An example of the request format is shown below:

```
POST /mapi/txs
[
    "txId",
    "txId",
    "etc....."
]
```

In step 118 the payment processor receives a response from a respective miner among the plurality of miners that are associated with creating and/or processing the blockchain transaction associated with the TxID. In some embodiments, the above RPC getRawTransaction(TxID) may include a Verbose parameter, which may relate to an argument set to 1. In this case, a returned result from a respective miner, if successful, will in some embodiments be in a JSON format containing the decoded corresponding blockchain transaction in step 110 and 112. This advantageously offers the flexibility of capturing and processing the data therein. If the Verbose parameter is set to 0 then instead of a JSON datatype or document format, the hex-encoded transaction is returned to the payment processor. If no such transaction relating to TxID is found Null may returned, which in turn will result in a ReturnResult object being set to 'Unknown'. Any other returned error may also be reported to the BlockHash and MinerID may be populated if the transaction has been successfully mined and flagged as Confirmed (i.e. added to a block) by the respective miner. If a miner has not set up their MinerID then then it will be set to "NULL".

The ReturnResult object may then contain one of the following mining results:

Submitted—no issues, transaction submitted to mempool

Confirmed—transaction confirmed—Confirmations cannot be 0 or Null

Rejected_DS—rejected due to double spend—DoubleSpendTxID cannot be Null

Rejected_Policy—rejected due to policy violations

Rejected_Invalid—rejected due to transaction being invalid

Rejected_FeeTooLow—Fee is too low, so miner will not include that Tx in a block

Rejected_KeepinMemPool—Tx is rejected but kept in mempool to check for double spends Unknown—transaction not seen or does not exist—it may be that a transaction with the TxID provided does not exist in the mempool or the blockchain. If so, this should be stated in the ResultDescription.

In the case where there are multiple transactions associated with the client to be queried together using the same or a separate endpoint associated with the payment processor, the response body returned may be in the below JSON format:

```
{
    "payload": "{\"apiverison\":\"1.0.1",
    \"timestamp\": ....................................},
    "signature": "30456598f65............",
    "publickey": "03fcfcfcfcfd08433fc.......",
    "encoding": "UTF-8",
    "mimetype": "application/json"
}
```

In some embodiments, for multiple transactions queried, the response body groups together Header info and Transaction level (payload) information

| field | function |
|---|---|
| payload | main data payload - based on transaction level information |
| signature | signature on payload string |
| publickey | Public key to verify signature |
| encoding | encoding type |
| mimetype | multipurpose internet mail extensions type |

An example of the payload or message field returned is given below:

```
{
    "apiVersion":"string",
    "timestamp":"string"
    "txs":[
        {
            "txid":"string",
            "minerid":"string | null",
            "returnResult":"string",
            "resultDescription":"string",
            "currentHighestBlockHash":"string",
            "currentHighestBlockHeight":"integer",
            "txSecondMempoolExpiry":"string",
            "confirmations": "integer (0 for unconfirmed)"
        }
    ]
}
```

Second Aspect—Client

FIG. 2 relates to the second aspect of the present disclosure and depicts a method performed by one or more processors associated with the client, where the client is communicatively coupled to at least one payment processor implementing the method as discussed in relation to first aspect. The payment processor implements the payment service or payment API discussed in relation to FIG. 1 for a client, as discussed above.

In the example scenario depicted in FIG. 2, the embodiments relating to the steps of obtaining a plurality of mining fee quotes, submitting a transaction based on a selected fee quote among the obtained plurality of mining fee quotes as well as sending a status query relating to a transaction identifier are all described as taking place in sequence, i.e. described as a single process in the flowchart of FIG. 2. However, the present disclosure and second aspect are not to be considered so limited. The below described steps relating to obtaining fee quotes in a first request in steps 202 to 206 may be implemented separately and independently of the remaining steps. Similarly, the steps relating to submitting a transaction in the second request from steps 208 to 212 may be implemented separately, and at a different time to the earlier steps of obtaining fee quotes. In the same way, the steps relating to a transaction status enquiry from step 214 onwards may be implemented at any time after the client has been made aware of the transaction's identifier and does not need to follow the sequence of FIG. 2. All steps are shown in sequence herein simply for ease of explanation and understanding and under no circumstances is the present disclosure to be considered limited to such sequence or scenario. Furthermore, as discussed above in relation to FIG. 1, the fee quotes can be requested and/or obtained and/or submitted and/or queried for a single transaction separately each time, or for a set or batch of multiple transactions that are to be submitted by the client in a single request, i.e. at the same time. For ease of explanation and understanding, FIG. 2 will be explained in relation to a single transition in a first request/second request and a status query that is associated with the client, but the present disclosure is not so limited in any way.

Step 202 depicts sending a first request to a payment processor among the at least one payment processors that are associated with the client for providing a respective payment service. As discussed in relation to step 102 of FIG. 1, the request is pertaining to one or more fee quotes for mining a transaction for the client. This first request relates to the HTTPS GET getFeeQuote discussed in relation to step 102. As discussed above, the request may be for mining any transaction for the client or may be a request for getting fee quotes for mining a transaction relating to a digital asset payment from a customer associated with the client. As discussed above, in some embodiment, the first request may also include details of a level of service required for one or more transactions to be mined. This may be in relation of speed of mining and/or protection against double spends offered by a miner.

In Step 204, a plurality of mining fee quotes is received from the payment processor, the fee quotes relating to mining fees for each of a plurality of miners that are communicatively coupled to the payment processor serving the client. The structure and details of the fee quotes received is already discussed in relation to step 104 of FIG. 1.

Step 206 depicts selecting a fee quote among the one or more fee quotes received in step 204. In some embodiments the selected fee quote may be based on a recommended fee quote proposed by the payment processor. In some embodiments, the selection is made by one or more processors associated with the client. The selected fee quote may be an average or median value of the obtained fee quotes, or the maximum value of the obtained fee quotes from the plurality of miners or the highest fee quote in a secondary mempool, as discussed above. So, the client can select the highest fee value obtained from the plurality of miners in response to the first request. This way, all miners can be provided with an equal chance of mining that transaction at their respective current quoted fee. However the client can instead select a fee quote that is at or above the median or average of all fee quotes received, so that miners with higher quotes may simply keep that transaction in a secondary mempool and use it to check against, and/or reject any double spends of the transactions.

Step 208 depicts the step requesting and/or processing the digital asset payment from the customer associated with the client. This may be a payment request, or an invoice sent by the client to the customer for the digital asset payment using known methods applied to respective digital wallets implementations for both parties. Since the selected fee quote for mining any transaction to the blockchain is already known, the request may include or be associated with the selected fee quote.

Step 210 depicts the step of sending a second request to submit to the blockchain, a given transaction associated with the digital asset payment from the customer to the payment processor. The submission in this step is based on the selected fee quote for mining the given transaction in step 206. This step relates to the client sending the HTTPS POST submitTransaction(Tx) request to the payment processor in step 108 of FIG. 1, with the relevant details in the JSON datatype format for the given transaction.

Step 212 depicts the step of receiving a transaction identifier (TxID) for a blockchain transaction corresponding to the submitted transaction. As discussed in steps 110 and 112 of FIG. 1, the TxID is created by at least one miner that satisfies the selected fee quote. In some embodiments, this may be sent in association with or as part of a transaction result, i.e. TxResult showing the current mining status of the corresponding blockchain transaction for the respective miner. This is described in relation to step 114 of FIG. 1.

Step 214 relates to the client sending a status query when the client wishes to query the mining status of a transaction previously submitted in step 210, relating to a payment between the client and a customer. As the client would have received the TxID of the submitted transactions in step 212, this request can be based on the TxID and in the format HTTPS GET queryTransactionStatus(TxID), as described in step 116 of FIG. 1.

Step 216 depicts obtaining a mining status result for the blockchain transaction corresponding to the transaction identifier TxID queried in step 214. This may be in a JSON format and is sent to the client using HTTPS by the payment processor, after the payment processor receives the details of the corresponding transaction. The status results may be in the form of a TxResult JSON object as seen in step 120 of FIG. 1.

Third Aspect—miner Implementation

FIG. 3 relates to the second aspect of the present disclosure and depicts a method performed by a miner among a plurality of miners, where the plurality of miners are communicatively coupled to at least one payment processor implementing the method as discussed in relation to first aspect. The payment processor implements the payment service or payment API discussed in relation to FIG. 1 for a client. The client is configured to implement the method discussed in related to FIG. 2.

In the example scenario depicted in FIG. 3, the embodiments relating to the steps of providing a plurality of mining fee quotes, generating/creating a blockchain transaction based on a selected fee quote among the obtained plurality of mining fee quotes, as well as providing a mining status relating to a transaction identifier are all described as taking place in sequence, i.e. described as a single process in the flowchart of FIG. 3. However, the present disclosure and third aspect are not to be considered so limited. The below described steps relating to providing current fee quotes in response to a first request in steps 302 and 304 may be implemented separately and independently of the remaining steps. Similarly, the steps relating to generating a corresponding blockchain transaction in response to the second request from steps 308 to 314 may be implemented separately, and at a different time to the earlier steps of obtaining fee quotes. In the same way, the steps relating to providing a transaction status in step 316 can be implemented at any time after the client has been made aware of the transaction's identifier and does not need to follow the sequence of FIG. 3. All steps are shown in sequence herein simply for ease of explanation and understanding and under no circumstances is the present disclosure to be considered limited to such sequence or scenario. Furthermore, as discussed above in relation to FIGS. 1 and 2 the fee quotes can be requested and/or obtained and/or submitted and/or queried for a single transaction separately each time, or for a set or batch of multiple transactions that are to be submitted by the client in a single request, i.e. at the same time. For ease of explanation and understanding, FIG. 3 will be explained in relation to a single transaction in a first request/second request and a status query that is associated with the client, but the present disclosure is not so limited in any way.

Step 302 depicts receiving a first request from a payment processor for providing a fee quote for a mining a transaction on behalf of a client. This request relates to the RPC getFeeQuote( ) request that is sent from the payment processor, as set out in relation to step 104 of FIG. 1.

Step 304 depicts providing a current fee quote pertaining to each miner among a plurality of miners for mining the transaction in the blockchain. The fee quote may be provided in a format of the JSON object FeeQuotes as set out in relation to step 104 of FIG. 1.

Step 306 depicts the step of a miner among the plurality of miners receiving a second request relating to submitting a given transaction associated with the client to the blockchain, where the given transaction is based on a selected fee quote from the client. The given transaction is related to the Tx in the POST submitTransaction(Tx) in step 210 of FIG. 2, i.e. a given digital asset payment transaction between the client and a customer. The RPC version of this received from the payment processor is RPC createRawTransaction(Tx) for the given transaction, as explained in relation to step 110 of FIG. 1.

Step 308 depicts checking that the miner meets or satisfies the selected fee quote from the client. This may include a determination of whether or not the current fee quote provided to the payment processor by the respective miner in step 304 is either at or below the selected fee quote that the client is willing to pay for mining the given transaction Tx.

If the current fee quote satisfies the selected fee quote, then in step 310 a blockchain transaction corresponding with the given transaction is created. This is discussed in relation to step 110 of FIG. 1. In some embodiments, a hex-encoded raw transaction corresponding to the given transaction is returned to the payment processor. An output script or UTXO is also provided to the payment processor, as discussed in step 112 of FIG. 1, where the output script incudes a transaction identifier (TxID) associated with the corresponding blockchain transaction that has been created by the respective miner. The output script (UTXO) for the blockchain transaction may then be added to the mempool associated with the miner for mining instantaneously or at a later time.

If the current fee quote does not satisfy the selected fee quote, i.e. if the respective miner's current fee quote is higher than that allowed or selected by the client, then the respective miner may in some embodiments choose to mine at a lower fee than the current fee quote, or may choose not to mine the given transaction since the selected fee is lower than their respective current quoted fee. In embodiments where the respective miner chooses not to mine the transaction at the lower selected fee quote, in step 312 the respective miner may instead add details in relation to a blockchain transaction constructed for the given transaction in a secondary memory pool associated with the respective miner. This transaction in some embodiments may be held in the secondary mempool and used to check for double spends.

All transactions stored in the secondary mempool may have a time of expiry, after which they can be purged.

On an assumption that a blockchain transaction has been created, i.e. that the respective miner meets the requirements of the selected fee quote set by the client, step 316 relates to the respective miner receiving a status query associated with the TxID of the blockchain transaction that was created for the client. This status enquiry is based on the RPC request RPC getRawTransaction(TxID) received via the API converter as discussed in relation to steps 116 and 118 of FIG. 1.

In step 318, a result based on a present mining status of the corresponding blockchain transaction pertaining to a respective miner is provided to the payment processor. This may be based on a JSON object structure for TxStatus as explained in relation to step 120 in FIG. 1.

FIG. 4 is a schematic diagram of a deployment architecture of the payment service provided to a client 402 as an API by a payment processor 404. There may be more than one such payment processor 404, and also the one or more payment processors 404 may be implemented as part of a client, or may be associated with the client, or may be implemented separately to the client and be in communication with the client over a communication network, such as the Internet. As discussed in the above aspects, communication between the client 402 and the payment processor 404 uses the HTTPS protocol. An API Converter 406 is also shown separately in this schematic but may in some embodiments be implemented as part of the payment processor 404. In some embodiments the API converter 406 may be operated by or implemented in associated with a plurality of miners 412-1 to 412-n. The API converter 406 allows for converting HTTPS requests to RPC requests before sending it on to one or more miners 412-1 to 412-n coupled to the payment processor 404 for providing a service to the client 402. The API converter 406 is shown as being connected to miners 412-1-412-n via a firewall 408. All communications associated with the miners 412-1 to 412-n use RPC. A node connector 410 is also shown for connecting a plurality of miners 412-1 to 412-n to the payment processor 404 via the firewall 408. In some embodiments, the node connector may ensure, or process RPC calls associated with one or more payment processors that implement a respective payment service, as discussed in relation to FIG. 1. The node connector 410 provides a secure communication channel between the API Converter 406 and one or more miners 412-1 to 412-n.

There can be one or more payment processors 404 connecting the miners 412-1 to 412-n via the API Converter 406. The client 402 will most likely include a digital wallet application to obtain quotes for miner fees (getFeeQuote), submit transactions (submitTransaction) and enquire the status of a transaction (queryTransactionStatus), as explained in relation to the first to third aspects for individual or multiple transactions. The payment processor 404 acts as a REST endpoint to the client 402, and the client may have anonymous access to this service. The miners 412-1 to 412-n may mine one or more nodes in exchange for mining rewards, which may in some embodiments be made up of block rewards and miner fees. A block reward is referred to a BSV or cryptocurrency awarded once a miner 412 successfully mines a block. A miner fee is the reward a miner 412 receives if they confirm a transaction and add it to a newly mined block.

Figure 5:
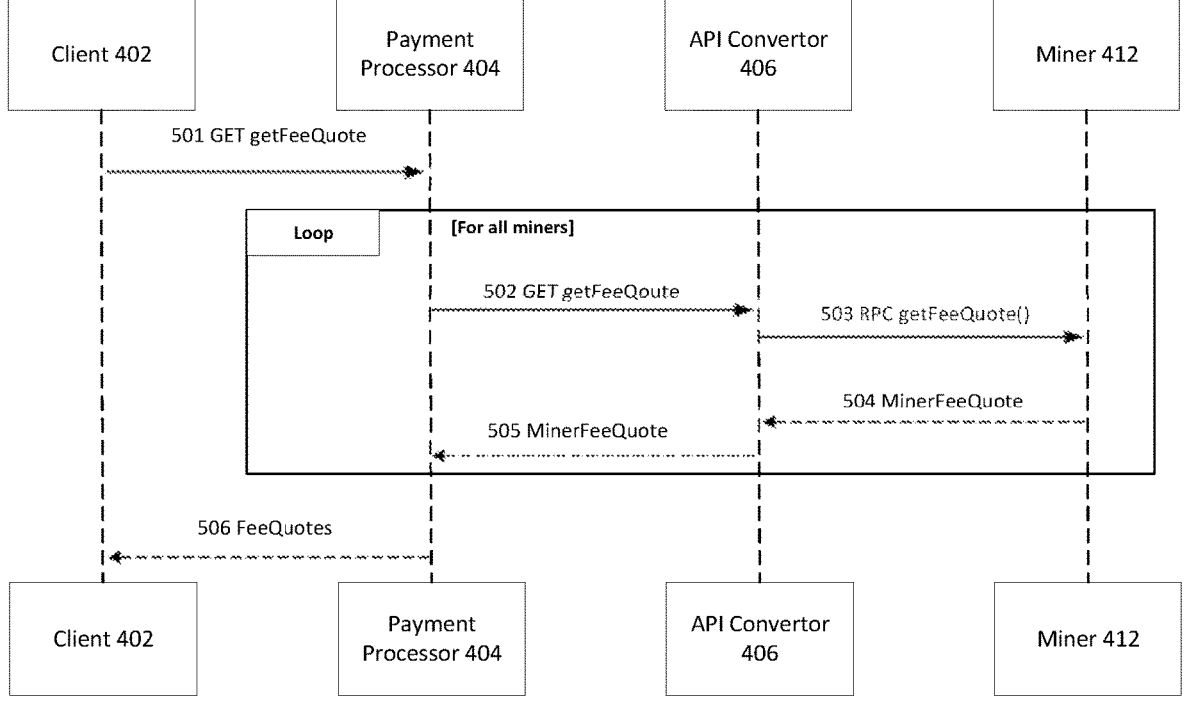
FIG. 5 is a schematic diagram depicting the flow of data associated with a first request for obtaining fee quotes associated with a plurality of miners.

FIG. 5 is a schematic diagram depicting the data flow between the components of the architecture shown in FIG. 4 for implementing the getFeeQuote command or template from the client. This is already discussed above in detail relation to FIGS. 1 to 3, and FIG. 4 simply sets out schematically the interaction of the client, payment processor and miners for obtaining mining fee quotes. The flow originates from the client 402 when the HTTPS GET getFeeQuote command is sent in step 501 to the payment processor 404. In step 502, the GET command is sent to the API converter 406, which converts this in step 503 to an RPC command RPC getFeeQuote( ) In step 504 MinerFeeQuote is returned to the API converter 406 as a JSON object format from each miner 412 in the plurality of miners 412-1 to 412-n, which is in turn provided to the payment processor 404 in step 505. Steps 502 to 505 are repeated for each miner among the plurality of miners 412-1 to 412-n and the result (the fee quotes) is the sent to the client 402 in a HTTPS transmission in step 506.

Figure 6:
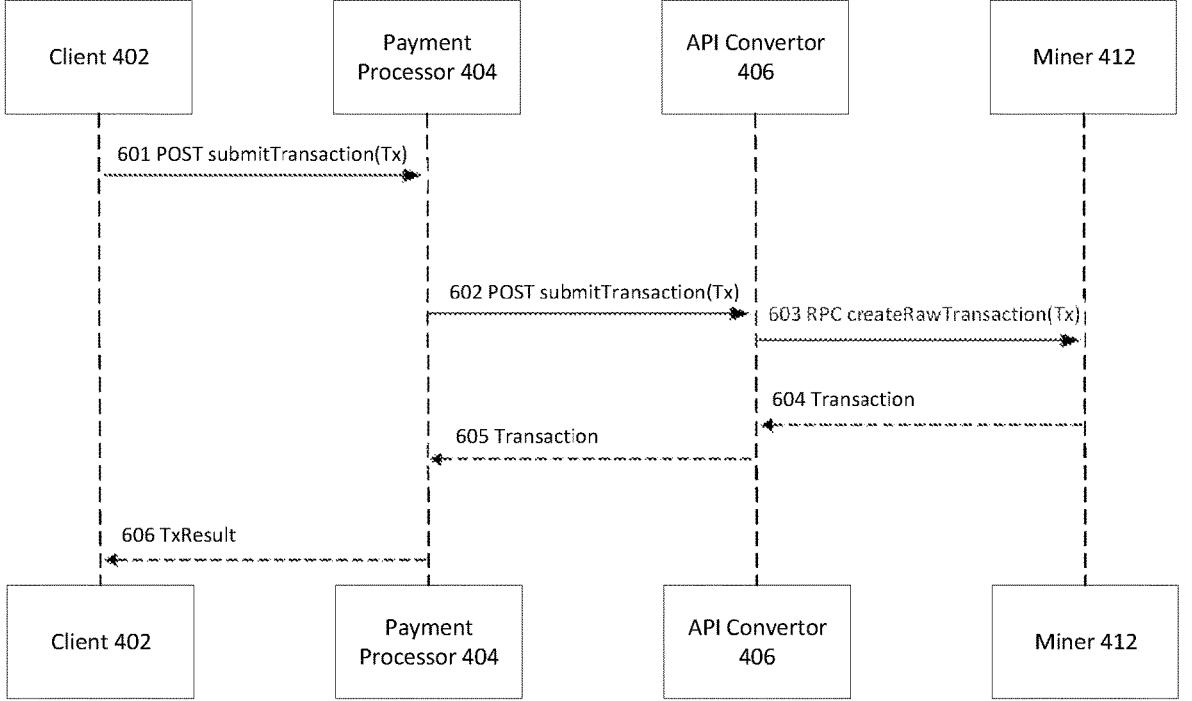
FIG. 6 is a schematic diagram depicting the flow of data associated with a second request for submitting a transaction based on a selected fee quote.

FIG. 6 is a schematic diagram depicting the data flow between the components of the architecture shown in FIG. 4 for implementing the submitTransaction command or template from the client. This is already discussed above in detail in relation to FIGS. 1 to 3, and FIG. 4 simply sets out schematically the interaction of the client, payment processor and miners for providing a blockchain transaction associated with a payment for a client. The flow originates from the client 402 when the HTTPS POST submitTransaction (Tx) command is sent in step 601 to the payment processor 404 for a given transaction Tx between the client 402 and a customer. As mentioned in relation to the above aspects, the Tx may be associated with a selected fee quote (not shown in this figure). In step 602, the POST command is sent to the API converter 406, which converts this in step 603 to an RPC command RPC createRawTransaction(Tx). The blockchain transaction is then constructed for each miner 412 that meets the selected fee quote. In step 604 the hex-coded blockchain transaction is returned to the API converter 406. The transaction includes a specific identifier TxID, as explained in the above aspects. In step 605 an output associated with the blockchain transaction is sent to the payment processor 404. A result pertaining to the blockchain transaction is then returned to the client as a JSON TxResult object that includes the TxID in step 606.

Figure 7:
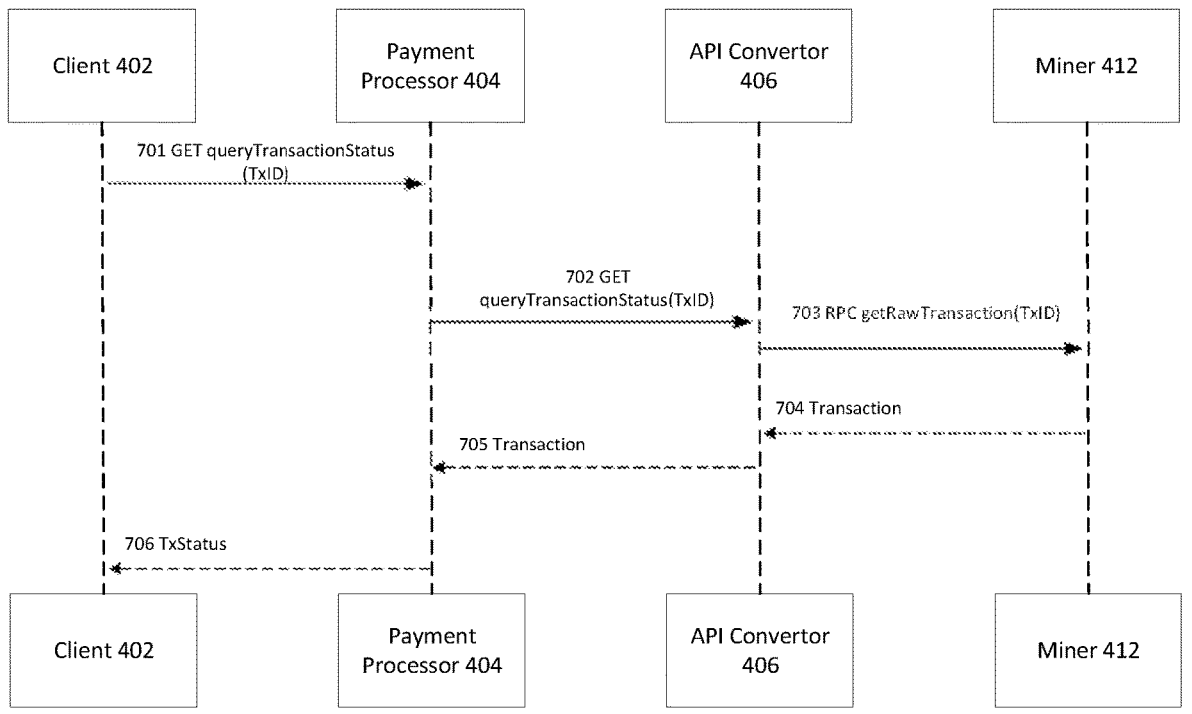
FIG. 7 is a schematic diagram depicting the flow of data associated with a status query based on a blockchain transaction identifier.

FIG. 7 is a schematic diagram depicting the data flow between the components of the architecture shown in FIG. 4 for implementing the queryTransactionStatus command or template from the client. This is already discussed above in detail relation to FIGS. 1 to 3, and FIG. 4 simply sets out schematically the interaction of the client, payment processor and miners for providing a blockchain transaction associated with a payment associated with a client. The flow originates from the client 402 when the HTTPS GET queryTransactionStatus(TxID) command is sent in step 701 to the payment processor 404 for a given transaction TxID relating to a blockchain transaction that was previously retuned to the client as part of the submitTransaction flow in FIG. 6. In step 702, the GET command is sent to the API converter 406, which converts this in step 703 to an RPC command RPC getRawTransaction(TxID). The blockchain transaction associated with a given miner 412 that pertains to the TxID is then identified. In step 704 the identified hex-coded blockchain transaction and its associated status is returned to the API converter 406. In step 705 a status result associated with the blockchain transaction pertaining to the TxID is sent to the payment processor 404. A status result pertaining to the blockchain transaction for TxID is then returned to the client as a JSON TxStatus object in step 706.

Furthermore, as discussed above in relation to FIGS. 1 to 3, the fee quotes can be requested and/or obtained and/or submitted and/or queried for a single transaction separately each time, or for a set or batch of multiple transactions that are to be submitted by the client in a single request, i.e. at the same time. For ease of explanation and understanding, FIGS. 4 to 7 have been explained above in relation to a single transition in a first request and/or second request and/or status query that is associated with the client, but it will be understood that the present disclosure is not so limited in any way.

Figure 8:
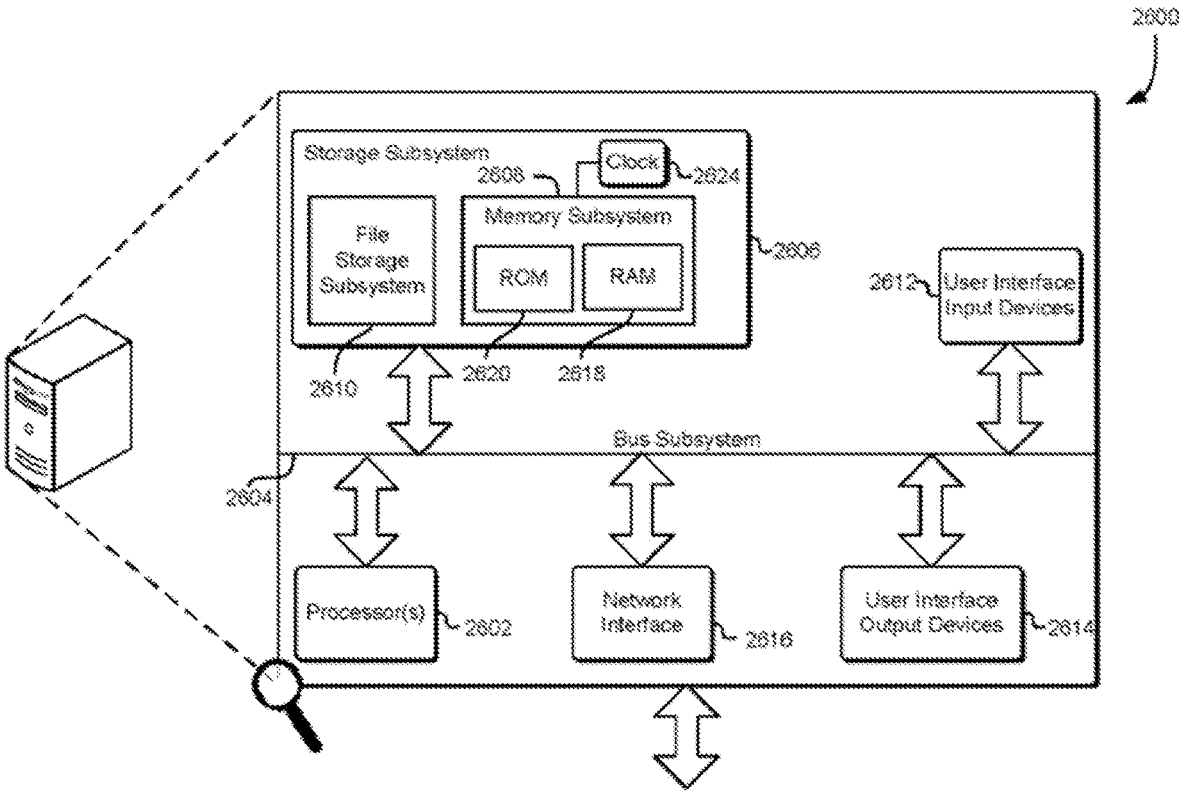
FIG. 8 is a schematic diagram illustrating a computing environment in which various aspects and embodiments of the present disclosure can be implemented.

Turning now to FIG. 8, there is provided an illustrative, simplified block diagram of a computing device 2600 that may be used to practice at least one embodiment of the present disclosure. In various embodiments, the computing device 2600 may be used to implement any of the systems illustrated and described above. For example, the computing device 2600 may be configured to be used as one or more components of DBMS of figure, or the computing device 2600 may be configured to be a client entity that is associated with a given user, the client entity making database requests for a database that is managed by the DBMS of FIG. 8. Thus, computing device 2600 may be a portable computing device, a personal computer, or any electronic computing device. As shown in FIG. 8, the computing device 2600 may include one or more processors with one or more levels of cache memory and a memory controller (collectively labelled 2602) that can be configured to communicate with a storage subsystem 2606 that includes main memory 2608 and persistent storage 2610. The main memory 2608 can include dynamic random-access memory (DRAM) 2618 and read-only memory (ROM) 2620 as shown. The storage subsystem 2606 and the cache memory 2602 and may be used for storage of information, such as details associated with transactions and blocks as described in the present disclosure. The processor(s) 2602 may be utilized to provide the steps or functionality of any embodiment as described in the present disclosure.

The processor(s) 2602 can also communicate with one or more user interface input devices 2612, one or more user interface output devices 2614, and a network interface subsystem 2616.

A bus subsystem 2604 may provide a mechanism for enabling the various components and subsystems of computing device 2600 to communicate with each other as intended. Although the bus subsystem 2604 is shown schematically as a single bus, alternative embodiments of the bus subsystem may utilise multiple buses.

The network interface subsystem 2616 may provide an interface to other computing devices and networks. The network interface subsystem 2616 may serve as an interface for receiving data from, and transmitting data to, other systems from the computing device 2600. For example, the network interface subsystem 2616 may enable a data technician to connect the device to a network such that the data technician may be able to transmit data to the device and receive data from the device while in a remote location, such as a data centre.

The user interface input devices 2612 may include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 2600.

The one or more user interface output devices 2614 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 2600. The one or more user interface output devices 2614 may be used, for example, to present user interfaces to facilitate user interaction with applications performing processes described and variations therein, when such interaction may be appropriate.

The storage subsystem 2606 may provide a computer-readable storage medium for storing the basic programming and data constructs that may provide the functionality of at least one embodiment of the present disclosure. The applications (programs, code modules, instructions), when executed by one or more processors, may provide the functionality of one or more embodiments of the present disclosure, and may be stored in the storage subsystem 2606. These application modules or instructions may be executed by the one or more processors 2602. The storage subsystem 2606 may additionally provide a repository for storing data used in accordance with the present disclosure. For example, the main memory 2608 and cache memory 2602 can provide volatile storage for program and data. The persistent storage 2610 can provide persistent (non-volatile) storage for program and data and may include flash memory, one or more solid state drives, one or more magnetic hard disk drives, one or more floppy disk drives with associated removable media, one or more optical drives (e.g. CD-ROM or DVD or Blue-Ray) drive with associated removable media, and other like storage media. Such program and data can include programs for carrying out the steps of one or more embodiments as described in the present disclosure as well as data associated with transactions and blocks as described in the present disclosure.

The computing device 2600 may be of various types, including a portable computer device, tablet computer, a workstation, or any other device described below. Additionally, the computing device 2600 may include another device that may be connected to the computing device 2600 through one or more ports (e.g., USB, a headphone jack, Lightning connector, etc.). The device that may be connected to the computing device 2600 may include a plurality of ports configured to accept fibre-optic connectors. Accordingly, this device may be configured to convert optical signals to electrical signals that may be transmitted through the port connecting the device to the computing device 2600 for processing. Due to the ever-changing nature of computers and networks, the description of the computing device 2600 depicted in FIG. 8 is intended only as a specific example for purposes of illustrating the preferred embodiment of the device. Many other configurations having more or fewer components than the system depicted in FIG. 8 are possible.

The invention claimed is:

1. A computer implemented method of providing a payment service for one or more clients for transactions associated with a blockchain, the method comprising the steps of:

receiving, by a payment processor, a first request from a client associated with mining a transaction in the blockchain, wherein optionally the transaction associated with the first request includes a batch of multiple transactions;

sending, by the payment processor, a request for a fee quote to each miner among a plurality of miners communicatively coupled to the payment processor;

obtaining, by the payment processor, a fee quote from each miner for mining the transaction;

providing, by the payment processor, the obtained fee quotes from the plurality of miners to the client, wherein a selected fee quote for mining the transaction is determined based on the obtained fee quotes or determining a selected fee quote for mining the transaction for the client based on the obtained fee quotes;

validating, by the payment processor, a respective fee quote obtained from a given miner among the plurality of miners based on a miner signature, said miner signature serving as a commitment from the given miner to mine the transaction for the respective fee quote, and to reject any conflicting transaction(s); and verifying, by the payment processor, an identity of the given miner among the plurality of miners, wherein the verification is based on an identifier pertaining to the given miner, said identifier being associated with a reputation indicator for the given miner;

the method further comprising the steps of:

including, by the given miner, the transaction in a block for mining:

receiving, by the given miner, one or more conflicting transactions:

excluding, by the given miner, the one or more conflicting transactions from the block for mining; and mining, by the given miner, the block.

2. The method of claim 1, further comprising the steps of:

responsive to a second request from the client to submit a given transaction pertaining to the selected fee quote among the obtained fee quotes, sending a request to one or more miners among the plurality of miners for generating a blockchain transaction corresponding to the given transaction, wherein optionally the given transaction includes a batch of multiple transactions;

receiving an output script associated with the corresponding blockchain transaction from at least one miner among the plurality of miners that satisfies the selected fee quote; and sending a result to the client, the result including a transaction identifier for the blockchain transaction corresponding to the given transaction.

3. The method as claimed in claim 1, wherein the step of providing the obtained fee quotes further comprises determining a recommended fee quote based on an average value of the obtained fee quotes or a maximum value among the obtained fee quotes, wherein optionally the method further comprises:

providing the recommended fee quote or providing all the obtained fee quotes including the recommended fee quote, wherein the recommended fee quote includes an identifier and/or optionally wherein the selected fee quote is the same as the recommended fee quote or different from the recommended fee quote, wherein the different fee quote is either predetermined or arbitrarily selected.

4. The method of claim 3, wherein the step of determining a selected fee quote comprises assigning a service level among a plurality of service levels to each of the obtained fee quotes, each service level being associated with a respective selected fee quote for mining the transaction; and optionally:

wherein the service level is assigned based on the obtained fee quote and a minimum relay fee associated with the miner pertaining to the respective fee quote, and/or wherein the assigned service level is indicative of a priority for mining the transaction and/or a level of protection against double spends associated with a transaction for the recommended fee quote; and/or wherein the service level for the transaction to be mined is assigned based on one or more service requirements obtained from the client.

5. The method of claim 2, wherein:

the fee quote obtained from each miner is provided in a datatype, said datatype being in a JavaScript Object Notation (JSON) object format; and/or the received output script is an Unspent Transaction Output (UTXO) associated with a mempool for at least one miner, the UTXO including a transaction identifier (TxID) for the blockchain transaction.

6. The method of claim 1, further comprising the steps of:

responsive to a status query associated with a transaction identifier from the client, sending a request to the plurality of miners for obtaining a blockchain transaction corresponding to the transaction identifier;

obtaining the corresponding blockchain transaction from at least one miner among the plurality of miners; and sending a status result pertaining to the obtained corresponding blockchain transaction to the client.

7. The method of claim 1, wherein the payment processor is implemented as a Representational State Transfer (REST) endpoint for the one or more clients, and wherein the method further comprises the step of providing an application programming interface (API) converter associated with the payment processor for performing the steps of:

receiving the first request and/or a second request and/or a status query pertaining to the transaction from the client using a Hypertext Transfer Protocol Secure (HTTPS) transmission protocol format;

converting the respective request to a Remote procedure Call (RPC) format, and sending the RPC to one or more of the plurality of miners;

receiving responses associated with a corresponding blockchain transaction from one or more miners among the plurality of miners in an RPC format; and converting the respective responses such that they may be sent to the client using the HTTPS transmission protocol.

8. A system comprising a computing device and a given miner among a plurality of miners, the computing device comprising a processor and memory, the memory including executable instructions that, as a result of execution by the processor, cause the computing device to perform a computer implemented method of providing a payment service for one or more clients for transactions associated with a blockchain, the method implemented by a payment processor and comprising the steps of:

receiving a first request from a client associated with mining a transaction in a blockchain;

wherein optionally the transaction associated with the first request includes a batch of multiple transactions;

sending a request for a fee quote to each miner among the plurality of miners communicatively coupled to the payment processor;

obtaining a fee quote from each miner for mining the transaction;

providing the obtained fee quotes from the plurality of miners to the client, wherein a selected fee quote for mining the transaction is determined based on the obtained fee quotes or determining the selected fee quote for mining the transaction for the client based on the obtained fee quotes;

validating a respective fee quote obtained from the given miner among the plurality of miners based on a miner signature, said miner signature serving as a commitment from the given miner to mine the transaction for the respective fee quote, and to reject any conflicting transaction(s); and verifying an identity of the given miner among the plurality of miners, wherein the verification is based on an identifier pertaining to the given miner, said identifier being associated with a reputation indicator for the given miner;

the given miner of the plurality of miners comprising a processor and memory, the memory including executable instructions that, as a result of execution by the processor, cause the given miner to perform the following steps: including the transaction in a block for mining;

receiving one or more conflicting transactions;

excluding the one or more conflicting transactions from the block for mining; and mining the block.

* * * * *